US006381027B1

(12) United States Patent
Tanaka

(10) Patent No.: US 6,381,027 B1
(45) Date of Patent: Apr. 30, 2002

(54) CHARACTER PROCESSING DEVICE

(75) Inventor: Seiji Tanaka, Toyoshima-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/250,054

(22) Filed: Feb. 12, 1999

(30) Foreign Application Priority Data

Feb. 19, 1998 (JP) .......................................... 10-054432

(51) Int. Cl.$^7$ ................................................ G06K 15/00
(52) U.S. Cl. ....................................... 358/1.11; 358/1.1
(58) Field of Search ................................ 358/1.1, 1.11, 358/1.9, 452, 1.2, 447, 462; 400/83, 63; 382/176, 177, 286, 309, 171, 170, 173; 345/467, 468, 469; 707/530, 531

(56) References Cited

U.S. PATENT DOCUMENTS 6,281,979 B1 * 8/2001 Atobe et al. ............... 358/1.11
6,290,327 B1 * 9/2001 Hosokawa et al. ........ 358/1.11

* cited by examiner

*Primary Examiner*—Arthur G. Evans
(74) *Attorney, Agent, or Firm*—Hogan & Hartson, L.L.P.

(57) ABSTRACT

There is provided a character processing device. A character string formed of at least one character is input. There are stored in advance a plurality of processing instruction elements each specifying a process for processing the character string and at least one keyword associated with the process. From the plurality of processing instruction elements, a processing instruction element specifying the at least one keyword is retrieved as the predetermined keyword by using a predetermined keyword. The character string is processed according to the processing instruction element when the processing instruction element has been retrieved by the retrieval means.

19 Claims, 19 Drawing Sheets

CHARACTER PROCESSING DEVICE

BACKGROUND OF THE INVENTION

1. Field of the Invention

This invention relates to a character processing device for processing (editing, printing and transmitting) characters, such as letters and symbols. A character string formed of a plurality of characters including one formed of a single character will be referred to as a "character string".

2. Prior Art

Conventionally, when a character processing device, e.g. a tape printing apparatus for printing an entered character string on a tape, is operated to print a character string, for instance, with a background having a color (background color) or a pattern, or a character string itself in a certain color (character color), the user himself selects a desired one from various types of background colors, patterns or character colors available for selection, to thereby carry out desired processing (editing or printing processing in this case) on the character string. Hereinafter, an element that defines a specific processing of a character string, which is available for selection, is referred to as "the processing instruction element". The processing instruction element has functions, for example, of selectively designating red or blue as the background color of a character string or a floral or an arabesque as the pattern thereof. Further, the above colors and patterns, such as "red" and "floral", which are displayed on a selection screen as options for selection of the processing instruction element represented thereby in processing a character string are referred to as "selection items".

The inventor of the present invention has discovered that when the user selects a selection item indicative of his (her) desired processing instruction element to process a character string, as described above, the user selects a processing instruction element having a relevance with the character string rather than selects one arbitrarily. That is, for instance, when a word "woman" is contained in a character string, the user selects such colors as red and pink, representative of feminine colors, as selection items of background colors and character colors of the character string, and a floral or the like as a selection item of a pattern thereof. As a result, since the range of selection items to be selected is often determined in advance, it is not necessary to display all the available selection items for the respective processing instruction elements on the selection screen. Moreover, if there are displayed an excessively large number of selection items, it takes time and labor to find out a desired one from them, which hinders the character string from being processed quickly.

SUMMARY OF THE INVENTION

It is an object of the invention to provide a character processing device which is capable of processing a character string required to be processed, according to the character string itself in a quick and simplified manner even when there are a lot of processing instruction elements available for selection.

To attain the above object, the invention provides a character processing device including:

input means for inputting a character string formed of at least one character;

storage means for storing a plurality of processing instruction elements each specifying a process for processing the character string and at least one keyword associated with the process;

retrieval means for retrieving from the plurality of processing instruction elements, by using a predetermined keyword, a processing instruction element specifying the predetermined keyword as one of the at least one keyword; and processing means for processing the character string according to the; processing instruction element when the processing instruction element has been retrieved by the retrieval means.

According to this character processing device, a processing instruction element specifying a predetermined keyword as one of at least one keyword thereof is retrieved from a plurality of processing instruction elements, and a character string is automatically processed by the process specified by the processing instruction element. By selecting a keyword having a relevancy with the process as the predetermined keyword, the character string to be processed can be suitably processed according to the retrieved processing instruction element in a simplified and quick manner.

Preferably, the character processing device includes keyword-extracting means for extracting at least one keyword as the predetermined keyword from the character string.

According to this preferred embodiment, the at least one keyword extracted from the character string is employed as the predetermined keyword, and hence the processing of the character string by the process relevant thereto is automatically carried out according to the retrieved processing instruction element. This enables the character string to be suitably processed in a quick and simplified manner.

Preferably, the character processing device includes keyword-presenting means for presenting a plurality of keywords for selection each associated with the process specified in each of any relevant ones of the plurality of processing instruction elements, and keyword-selecting means for selecting the predetermined keyword from the presented keywords.

According to this character processing device, the user selects one of keywords for selection which are presented in advance before processing of the character string and are relevant to a process desired to be carried out, and then the character string is automatically processed in accordance with a processing instruction element specifying the selected keyword for selection, that is, by the process specified by the processing instruction element. Therefore, the character string can be processed in a fashion complying with the user's intention and at the same time in a quick and simplified manner.

Naturally, it is preferred that the at least one keyword has a relevancy with the process.

Preferably, the character processing device further includes candidate-setting means for setting, when there are a plurality of processing instruction elements retrieved by the retrieval means, the plurality of processing instruction elements retrieved by the retrieval means to candidates for selection, and processing instruction-selecting means for selecting the processing instruction element from the plurality of processing instruction elements set to the candidates for selection.

According to this preferred embodiment, when there are retrieved a plurality of processing instruction elements which are capable of suitably processing the character string, it is possible to further select one therefrom. Hence, it is possible to select a suitable processing instruction element for the character string in a more simplified and quicker manner than when the user selects a desired one from all the processing instruction elements.

More preferably, the processing instruction-selecting means comprises keyword-extracting means for extracting at least one keyword from the character string as the predetermined keyword, and second retrieval means for retrieving, from the plurality of processing instruction elements set to the candidates for selection, the processing instruction element, by using the at least one keyword extracted.

According to this preferred embodiment, through selection of one of the keywords for selection, if there are retrieved a plurality of processing instruction elements complying with the user's intention, the retrieval using the at least one keyword extracted from the character string is carried out to select a processing instruction element. Therefore, it is possible to process the character string in a manner further complying with the user's intention.

Further preferably, the character processing device further includes second candidate-setting means for setting, when there are a plurality of processing instruction elements retrieved by the second retrieval means, the plurality of processing instruction elements retrieved by the second retrieval means to second candidates for selection, and second processing instruction-selecting means for selecting the processing instruction element from the plurality of processing instruction elements set to the second candidates for selection.

According to this preferred embodiments, when there are a plurality of processing instruction elements complying with the user's intention retrieved as the results of the retrieval carried out using the selected one of the keywords presented for selection and further the retrieval using the keyword extracted from the character string, it is possible to select one from the retrieved processing instruction elements, and the character string is automatically processed by the selected processing instruction element. The process specified in the selected processing instruction element has a relevance with the keyword selected by the user and the keyword extracted from the character string, and hence by carrying out the processing of the character string according to the selected processing instruction element, it is possible to effect the processing of the character string in a fashion further complying with the user's intention as well as in a quick and simplified manner.

More preferably, the character processing device further includes immediately preceding processing-storing means for storing a processing instruction element selected in an immediately preceding character processing operation, and the candidate-setting means also sets the processing instruction element stored in the immediately preceding processing-storing means to one of the candidates.

According to this preferred embodiment, a processing instruction element selected in the immediately preceding character processing is also set to one of the candidates for selection, and hence it is possible to repeatedly carry out the same processing as carried out in the immediately preceding occasion.

More preferably, the character processing device further includes immediately preceding processing-storing means for storing a processing instruction element selected in an immediately preceding character processing operation, and the second candidate-setting means also sets the processing instruction element stored in the immediately preceding processing-storing means to one of the second candidates.

According to this preferred embodiment, a processing instruction element selected in the immediately preceding character processing is also set to one of the second candidates for selection, and hence it impossible to repeatedly carry out the same processing as carried out in the immediately preceding occasion.

More preferably, the character processing device further includes most frequent processing-storing means for storing a processing instruction element selected from the plurality of processing instruction elements a largest number of times, and the candidate-setting means also sets the processing instruction element stored in the most frequent processing-storing means to one of the candidates.

According to this preferred embodiment, a processing instruction element frequently used by the user is set to one of the candidates for selection, and hence the user can repeatedly carry out user's favorite processing.

More preferably, the character processing device further includes most frequent processing-storing means for storing a processing instruction element selected from the plurality of processing instruction elements a largest number of times, and the second candidate-setting means also sets the processing instruction element stored in the most frequent processing-storing means to one of the second candidates.

According to this preferred embodiment, a processing instruction element frequently used by the user is set to one of the second candidates for selection, and hence the user can repeatedly carry out user's favorite processing.

Preferably, the input means includes read/conversion means which reads an image of a character string formed of at least one character written on paper, and at the same time converts the image to the input character string.

According to this preferred embodiment, a character string written on paper is read in and converted to a character string required to be processed, whereby the character string can be input for processing, which makes it possible to process the character string printed on paper by facsimile, for example.

For instance, the process specified by each of the plurality of processing instruction elements includes a process for editing the character string, a process for printing the character string, and a process for data transmission of the character string.

According to this preferred embodiment, it is possible to carry out at least one of editing, printing and data transmitting of the character string with ease and rapidity.

Preferably, the plurality of processing instruction elements are stored in the storage means in the form of a table specifying the process and the at least one keyword associated with the process for each of the plurality of processing instruction elements.

Preferably, the plurality of processing instruction elements are stored in the storage means in the form of a first table specifying the process and the at least one keyword associated with the process for each of the plurality of processing instruction elements and a second table specifying the process and a relevant one of the keywords for selection for the each of the plurality of processing instruction elements.

Preferably, the character processing device includes a display device, and the keyword-presenting means displays each of the keywords for selection on the display device for enabling selection thereof.

In one preferred embodiment, the character processing device includes e printing device, and the candidate-setting means includes print-instructing means for instructing the printing device to print information of the processing instruction elements set to the candidates.

Similarly, the second candidate-setting means includes print-instructing means for instructing the printing device to print information of the processing instruction elements set to the candidates.

The above and other objects, features, and advantages of the invention will become more apparent from the following detailed description taken in conjunction with the accompanying drawings.

BRIEF DESCRIPTION OF THE DRAWINGS

FIGS. 10A and 10B are diagrams each showing a screen displayed when a fully automatic coloring function is made use of, in which:

FIG. 10A is a diagram showing a selection screen in which execution of preview printing is selected; and FIG. 10B is a diagram showing a displayed screen during execution of the preview printing;

FIGS. 14A and 14B are diagrams each showing a printed image as results of preview printing, in which:

FIG. 14A is an example of an image printed on a tape having a large width; and FIG. 14B is another example of an image printed on a tape having a small width;

FIGS. 19A, to 19C are diagrams each showing a screen displayed when the semiautomatic coloring function is made use of, in which:

FIG. 19A is a diagram showing a selection screen for selecting a title of an impression of a background image;

FIG. 19C is a diagram showing a screen displayed during execution of preview printing;

DETAILED DESCRIPTION

The invention will now be described in detail with reference to the drawings showing an embodiment thereof. In this embodiment, a character processing device according to the invention is applied to a tape printing apparatus which is capable of carrying out color printing of entered desired characters and the like on a printing tape Ti by an ink jet printing method as well as cutting off the printed portion or strip of the printing tape Ti to thereby produce a label.

Figure 1:
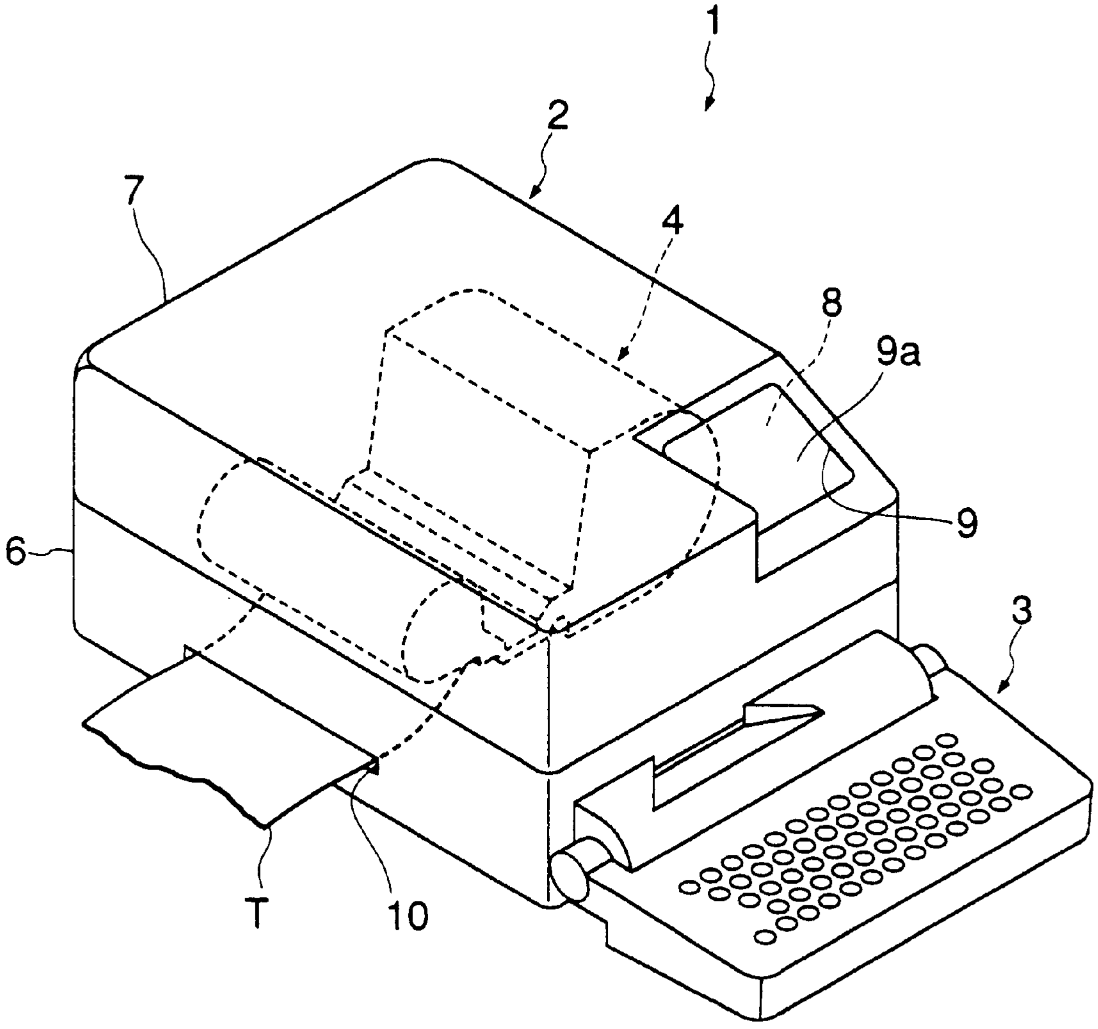
FIG. 1 is a perspective view of an appearance of a tape printing apparatus incorporating a printing apparatus according to an embodiment of the invention.
Figure 2:
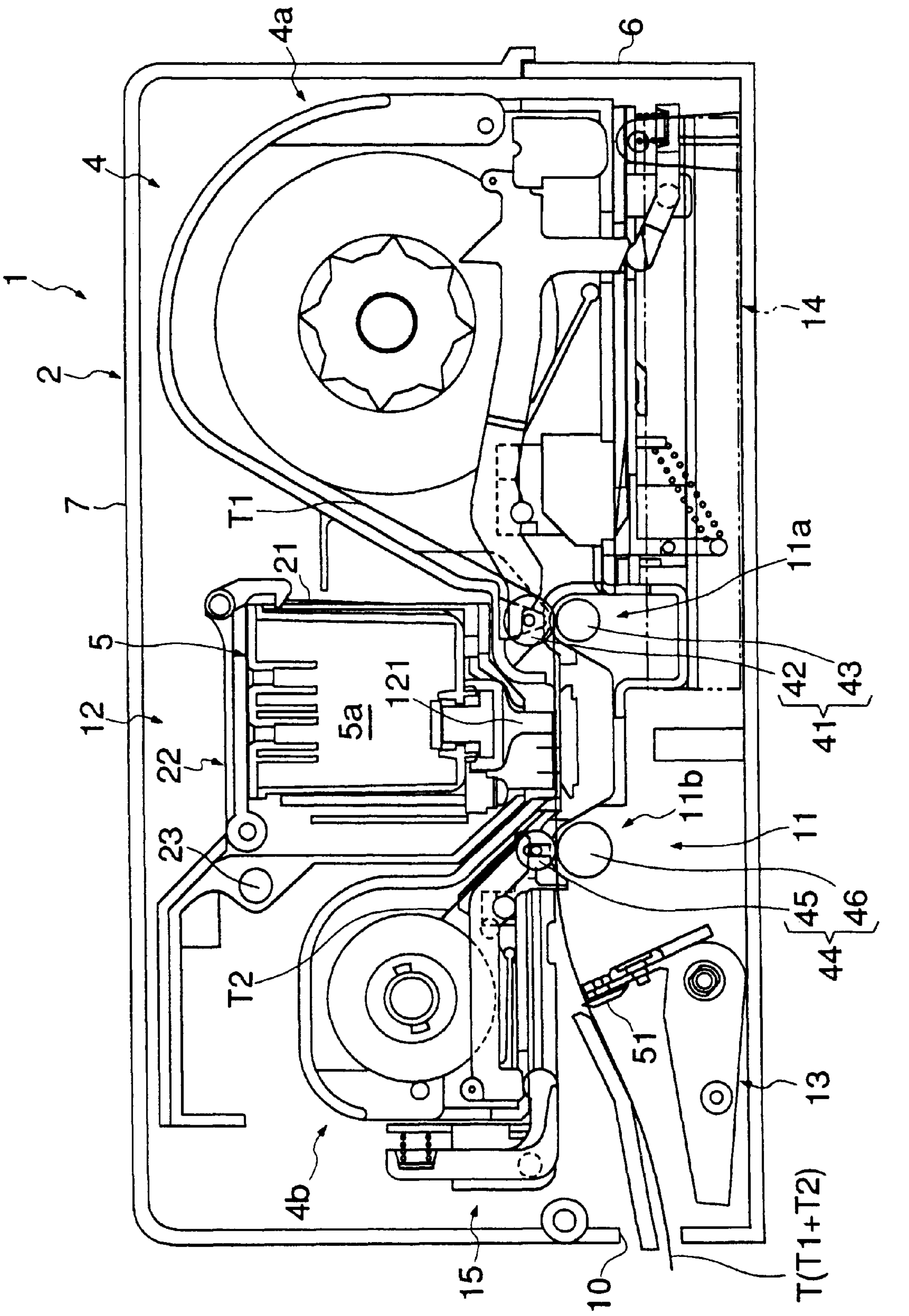
FIG. 2 is a cross-sectional view showing an internal construction of a body of the tape printing apparatus.

Referring first to FIGS. 1 and 2, the tape printing apparatus 1 includes a body 2, a keyboard 3 for entering and editing characters, a tape cartridge 4 accommodating a tape T as a printing medium, and an ink cartridge 5 filled with four colors of ink (see FIG. 2). The tape cartridge 4 and the ink cartridge 5 are removably loaded in the body 2.

The body 2 includes an apparatus casing 6. The upper part of the apparatus casing 6 is in the form of a lid 7 which can be opened and closed for loading and removing the tape cartridge 4 and the ink cartridge 5. The lid 7 has a small window 9 formed at a right-side upper portion on a front side thereof (on a keyboard 3 side) at a location corresponding to an image display block 8 arranged within the apparatus body 2. The small window 9 has a transparent panel 9*a* assembled therewith. The apparatus casing 6 has a side wall formed with a tape exit 10 in the form of, a slit via which the tape T is delivered out of the apparatus.

Referring to FIG. 2, inside the apparatus casing 6, there are mounted the tape cartridge 4 accommodating the roll of the tape T, a tape feed block 11 for feeding the tape T out of the body 2, a printer block 12 for carrying out color printing of a print image, a cutting block 13 for cutting off the tape T, and a circuit board 14 for controlling each block of the tape printing apparatus 1.

The tape cartridge 4 includes a printing tape T1 on which a print image is printed and a laminating tape T2 which is affixed to the printed portion of the printing tape T1 from above. The printing tape T1 and laminating tape T2 are stored, each in the form of a roll, in a printing tape-holding block 4*a* and a laminating tape-holding block 4*b* arranged respectively on opposite lateral sides of the printer block 12. The printing tape T1 is comprised of a substrate tape, an adhesive layer coated on an underside surface of the substrate tape and a peel-off paper tape affixed to the adhesive layer. On the other hand, the laminating tape T2 is comprised of a substrate tape formed of a transparent film and an adhesive layer coated on an underside surface of the substrate tape. The printing tape T1 and the laminating tape T2 are fabricated to have substantially identical widths and affixed to each other in a manner such that lateral side edges thereof are aligned with each other when printing is carried out.

The printer block 12 includes a print head 121 having a lot of ink nozzles, not shown, juxtaposed on an end thereof, a cartridge holder 21 arranged above the print head 121, an ink cartridge 5 removably mounted and held on the print head 121 by the cartridge holder 21, and a carriage 22 carrying the print head 121 and the ink cartridge 5 thereon. The ink cartridge 5 has ink tanks 5*a* filled with yellow ink, cyan ink, magenta ink and black ink, respectively. When the ink cartridge 5 is loaded in the print head 121, ink from the ink cartridge 5 is allowed to flow from four ink tanks 5*a* to the print head 33.

Figure 5:
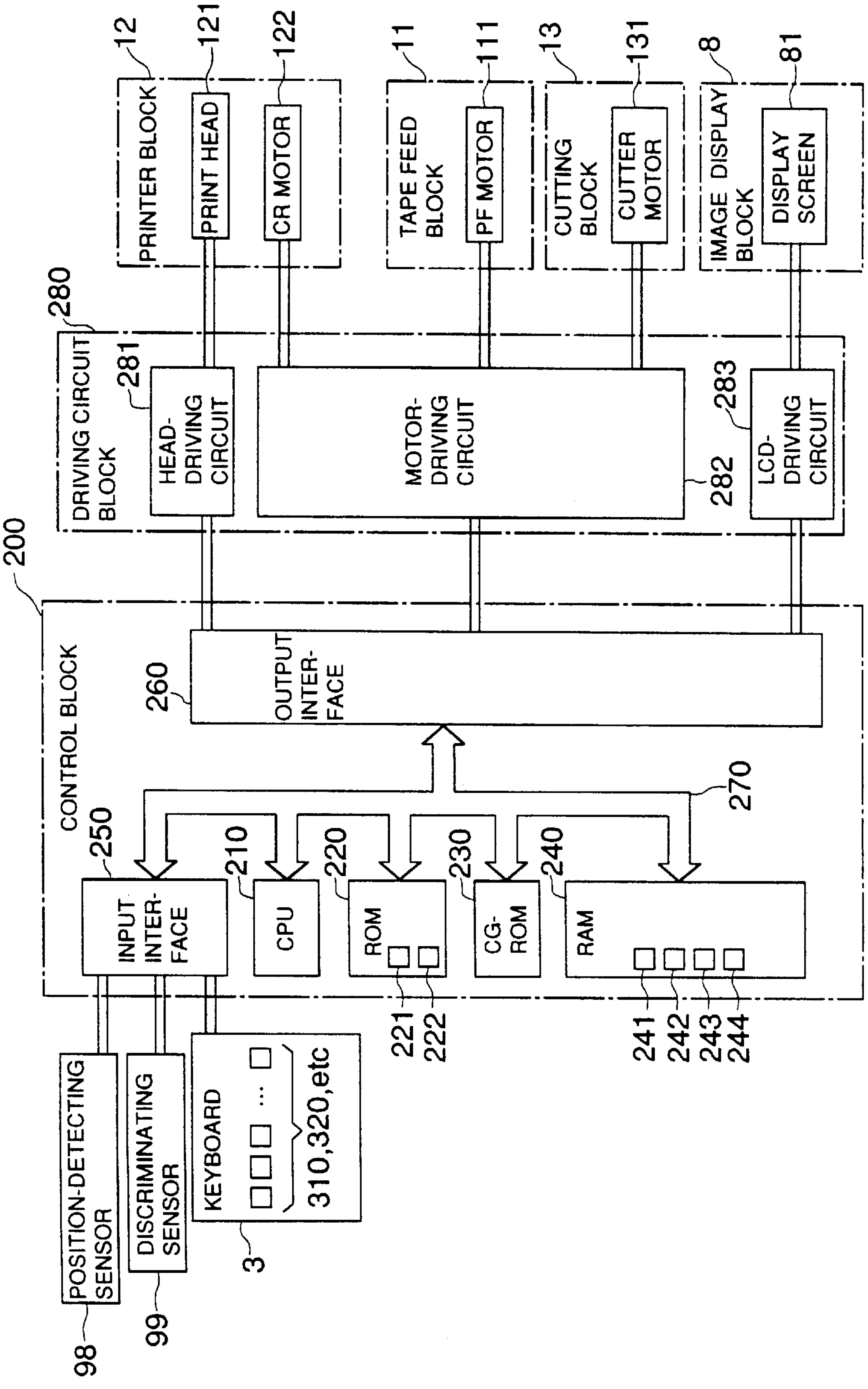
FIG. 5 is a block diagram schematically showing a control system of the tape printing apparatus.
Figure 6:
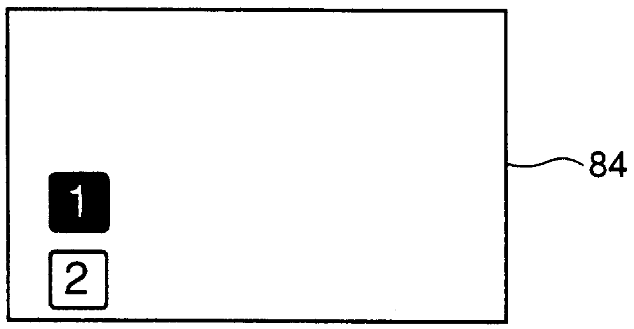
FIG. 6 is a diagram showing an initial screen displayed on a display area of the tape printing apparatus.

The carriage 22 is slidably mounted on the carriage guide shaft 23 extending in the direction of the width of the printing tape T1 and can be reciprocated rightward and leftward (in the direction of the width of the printing tape T1) by a timing belt 95 which is driven in a normal or reverse direction according to normal or reverse rotation of a carriage motor (CR motor) 122 (see FIG. 5). Further, the carriage 22 has light shields, not shown, projecting therefrom. When one of the light shields is brought before an associated one of position-detecting sensors 98 (see FIG. 5) each comprised of a photo interrupter or the like, the print head 121 is detected to be at a home position, not shown, whereby the correction of the position of the print head 121, such as zero position adjustment, is carried out. More specifically, the home position serves not only as a standby position of the print head 121 but also as a reference position for printing. The CR motor 122 is driven for rotation in a predetermined number of steps to move the print head 121 from the reference position, whereby the carriage 22 is moved with accuracy to each position in the direction of the width of the printing tape T1 within a printing range, and the print head 121 is driven for printing in synchronism with movement of the carriage 22 to thereby effect printing of characters and FIGS. on a surface of the printing tape T1 in a desired manner.

The tape cartridge 4 is provided with a discriminating plate, not shown, bearing discriminating information based on bit patterns or the like. A discriminating sensor 99 (see FIG. 5) mounted on the carriage 22 is brought to the discriminating plate to thereby discriminate the type or kind of tape T as well as detect a print-starting position for starting a printing operation on the printing tape T1 of the tape T.

The tape feed block 11 has a printing tape feed mechanism 11*a* and a laminating tape feed mechanism 11*b* arranged respectively on opposite sides of the print head 121, that is, at a location upstream of the print head 121 and at a location downstream thereof in a direction of feeding of the tape T. The printing tape feed mechanism 11*a* includes feed roller means 41 comprised of a feed driven roller 42 positioned above and a feed drive roller 43 positioned below and a tape feed motor 111 (PF motor) (see FIG. 5) for driving the feed drive roller 43 for rotation.

The feed drive roller 43 is arranged in the body 2 of the tape printing apparatus, while the feed driven roller 42 is arranged in the tape cartridge 4. When the tape cartridge 4 is mounted in the body 2, the feed driven roller 42 presses the printing tape T1 in a manner sandwiching the tape T1 between the feed drive roller 43 and the feed driven roller 42 itself. The printing tape T1 is advanced in this state as the feed motor rotates.

On the other hand, the laminating tape feed mechanism 11*b* includes laminating roller means 44 comprised of a laminating driven roller 45 positioned above and a laminating drive roller 46 positioned below, and a laminating motor, not shown in FIG. 2, for driving the laminating drive roller 46 for rotation. The laminating motor and the tape feed motor are implemented by an identical or single motor (PF motor 111), torque of which is split via a reduction gear train, not shown, to actuate the feed roller means 41 and the laminating roller means 44, respectively.

The laminating drive roller 46 and the laminating driven roller 45i are arranged in the body 2 and in the tape cartridge 4, respectively, similarly to the feed drive roller 43 and the feed driven roller 42. When the tape cartridge 4 is mounted in the body 2, the laminating driven roller 45 presses the printing tape T1 and the laminating tape T2 in a manner sandwiching the same between the laminating drive roller 46 and the laminating driven roller 45 itself. The printing tape T1 and the laminating tape T2 are advanced in this state while being affixed to each other as the feed motor rotates.

The cutting block 13 is comprised of a cutter 51 and a cutter motor L31 (see FIG. 5) for driving the cutter 51 for cutting operation. After the printing is completed, the tape T is stopped when the PF motor 111 further feeds the same by a predetermined number of steps, and immediately thereafter, the cutter motor 131 starts driving the cutter 51 for cutting the tape T.

The keyboard 3 is hinged on a lower portion of a front surface of the body 2 of the tape printing apparatus 1 such that it can be brought either to an upright position or to a horizontal position for use with the body 2. Therefore, the keyboard 3 is brought to the horizontal position when the apparatus CL is in use (see FIG. 1), while it is held in the upright or folded position, i.e. covers the front surface of the apparatus 1 when the apparatus 1 is carried or put away by the user. As described above, the whole apparatus can be made compact when it is carried or put away, which gives enhanced portability and accommodation to the tape printing apparatus 1.

Figure 3:
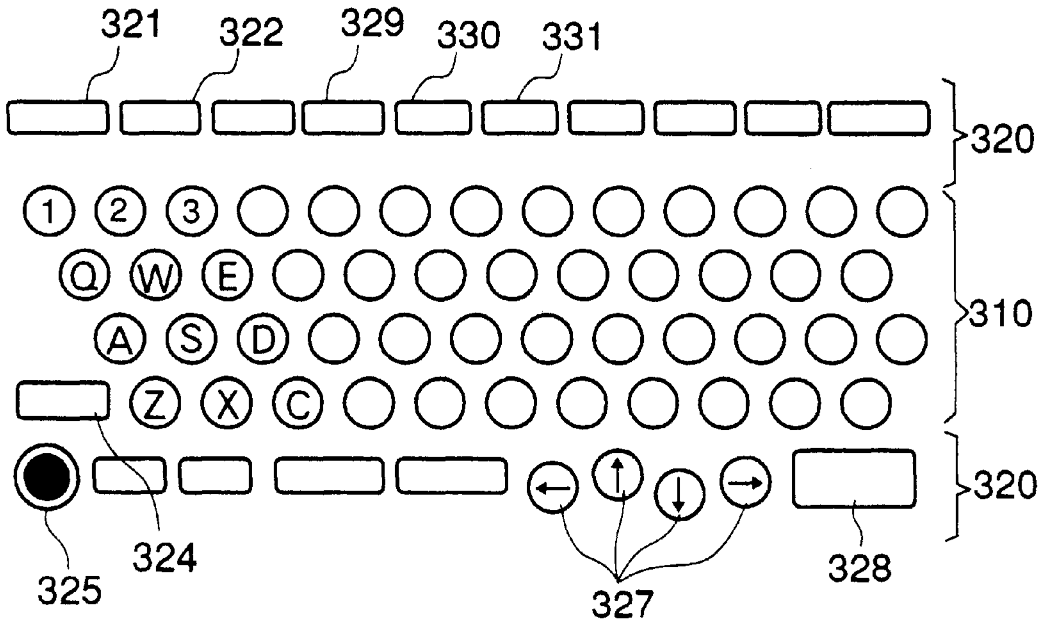
FIG. 3 is a block diagram showing a key arrangement on a keyboard.

FIG. 3 is a diagram showing the arrangement of keys on the keyboard 3. As shown in the FIG., the keyboard 3 has a lot of character keys 310 for entering characters, such as letters, symbols and the like, and a plurality of function keys 320, 320 arranged on transversely opposite sides of the character keys 310. Each of the character keys 310 has a circular convex shape and on the top surface thereof there are printed the alphabetic characters and symbols (only some of them are shown in FIG. 3). On the other hand, most of function keys 320, 320 arranged on the upper and lower sides have a rectangular convex shape, and on the top surface of each of them is printed a function thereof.

The upper function keys 320 mainly include keys for changing the operational mode of the tape printing apparatus 1 to respective edit modes (including a printing mode), such as a print information key 329, a background edit key 330, and a character color edit key 331. By depressing a specific one from these keys, the operational mode can be changed e.g. to a background edit mode for setting a background of an image character string entered, a character color edit mode for setting a color of character images, or the like. Further, a key 321 at a left end is a print key for instructing a printing operation, while an automatic coloring key 322 adjacent to the print key 321 on the right side thereof is one for carrying out a fully automatic coloring function and a semiautomatic coloring function, described hereinafter.

On the other hand, the lower function keys 320 include, for instance, cursor keys 327 and a selection key 328, which are used for selecting desired options when the operational mode is an edit mode. The shift key 324 is depressed simultaneously with the character key 310 or other function keys 320 so as to input a letter or the like printed in an upper part of the top of each character key 310 or cause a function printed in an upper part of the top of each function key 320 to be carried out. Further, reference numeral 325 designates a power key of the tape printing apparatus 1, and reference numeral 326 a space key 326.

Figure 4:
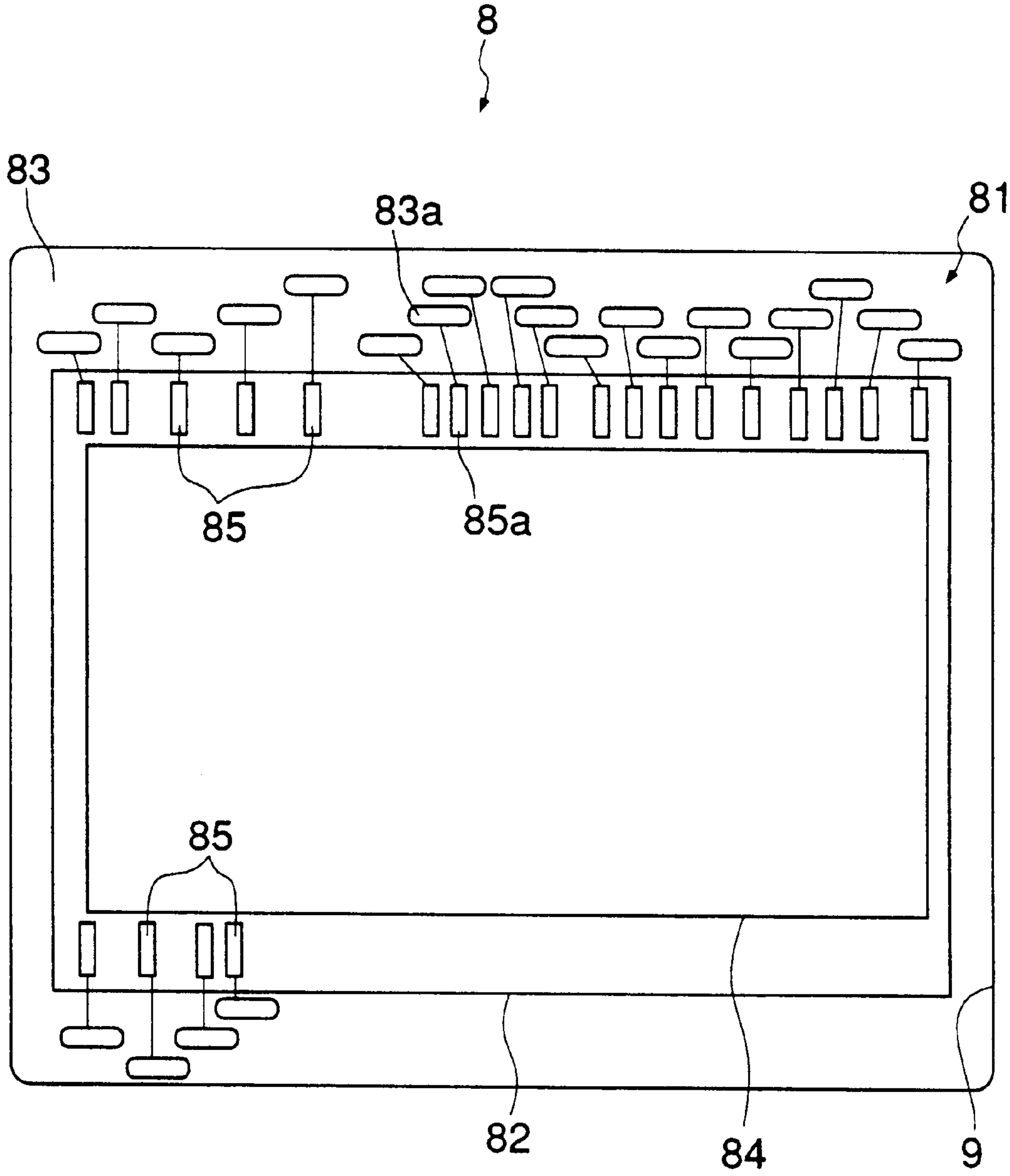
FIG. 4 is an enlarged plan view of an image display block.

FIG. 4 is an enlarged plan view showing the image display block 8. The image display block 8 has a display screen 81 for displaying an image of input characters and the like. The display screen 81 is formed of a monochrome liquid crystal display and is divided into a liquid crystal display block 82 for displaying the above input character images and a plurality of indicators 85, referred to hereinafter, on liquid crystal screens, and a mode title block 83 surrounding the periphery of the liquid crystal display block 82, for showing titles of modes indicated by associated ones of the indicators 85. Most part of the liquid crystal display block 82 is occupied by a display area 84 on which are displayed not only images of input characters but also images to be obtained by printing input characters (print images), menus options and the like shown during editing of the print images. Further, when print images are displayed, the, liquid crystal display block 82 is capable of displaying the print images in several levels of gray (four levels of gray in the present embodiment).

In the tape printing apparatus, a mode of entering characters via the keyboard 3, a typeface of character images (Gothic typeface or the like) for printing, a printing style (fixed length print or the like), a background of a character image (plain-colored background, decorative background or the like) etc. (hereinafter generically referred to as "the mode style") employed when in use are indicated by lighting corresponding ones of the indicators 85. For instance, when Gothic typeface is designated as a typeface of character images, an indicator 85*a* directly below a mode title "Gothic" 83*a* is lighted.

Next, the basic configuration of the control system of the tape printing apparatus 1 will be described with reference to FIG. 5. As shown in the FIG., in the tape printing apparatus 1, a control block 200 mounted on the above circuit board 14 controls the printer block 12, the tape feed block 11, the cutting block 13, and the image display block 8 via a drive circuit block 280, in response to signals delivered from the keyboard 3, the position-detecting sensors 98 and the discriminating sensor 99.

The control block 200 includes a CPU 210, a ROM 220, a character generator ROM (hereinafter referred to as "the CG-ROM") 230, a RAM 240, an input interface 250, and an output interface 260, all of which are connected to each other by an internal bus 270.

The ROM 220 stores control programs executed by the CPU 210, a color conversion table 221 and a character modification table 222, as well as keywords and backgrounds of labels having background images or the like, referred to hereinafter. The CG-ROM 230 stores font data, i.e. data defining characters, such as letters, symbols and FIGS., provided for the tape printing apparatus 1. When code data for identifying characters are input to the CG-ROM 230, it outputs the corresponding font data.

The RAM 240 includes areas of a register group 241, a text memory 242 for storing text data of characters entered via the keyboard 3, a displayed image data memory 243 for storing image data representative of an image displayed on the display screen 81, a print image data memory 244 for storing print image data representative of a print image. The RAM 240 is used as a work area for carrying out the control process. Further, the RAM 240 is supplied with power by a backup circuit, not shown, such that the data stored therein can be preserved even when the power is turned off.

The input interface 250 is a circuit which is connected to the keyboard 3, the position-detecting sensors 98 and the discriminating sensor 99, for receiving commands and data entered via the keyboard 3, the position-detecting signal generated by the position-detecting sensors 98 and the discriminating information signal generated by the discriminating sensor 99, and inputting these to the internal bus 270. The output interface 260 is a circuit for outputting data and control signals input into the internal bus 270 by the CPU 210 or the like to the driving circuit block 280.

The position-detecting sensors 98 detect that the print head 121 has reached the home position and generate the position-detecting signal indicative of detection of the home position of the print head 121, which is supplied to the control block 200. The discriminating sensor 99 discriminates the type of tape cartridge 4 and tape T to generate the discriminating information signal indicative of the sensed type of the tape cartridge 4 and tape T, and detects the print-starting position for starting a printing operation on the printing tape T1 to generate a signal indicative of detection of the print starting position. These signals: are supplied to the control block 200.

The driving circuit block 280 is comprised of a head-driving circuit 281, a motor-driving circuit 282 and a liquid crystal display (LCD)-driving circuit 283. The head-driving circuit 281 drives the print head 121 of the printer block 12 in accordance with control signals delivered from the control block 200. Similarly, the motor-driving circuit 282 drives the CR motor 122 of the printer block 12, the PF motor 111 of the tape feed block 11, and the cutter motor 131 of the cutting block 13 according to the commands from the control block 200. Similarly, the liquid crystal display (LCD) -driving circuit 283 controls the image display block 8 in accordance with the commands from the control block 200.

In the control system constructed as above, the CPU 210 of the control block 200 receives via the input interface 250 the commands and data entered via the keyboard 3, the position-detecting signal from the position-detecting sensors 98 and the discriminating information signal from the discriminating sensor 99 according to the control program read from the ROM 220, processes font data from the CG-ROM 230 and various data stored in the RAM 240, and delivers control signals to the driving circuit block 280 via the output interface 260 to thereby carry out position control during printing operations, discriminating control of discriminating the type or kind of tape cartridge 4 and the tape T, the display control of the display screen 18, and the printing control that causes the print head 121 to carry out color printing on the tape T under predetermined printing conditions. In short, the CPU 210 controls the overall operation of the tape printing apparatus 1.

The character processing device according to the invention applied to the tape printing apparatus 1 is mainly realized by the image display block 8, the control block 200 and the keyboard 3. Now, in the following, operations characteristic of the character processing device are described with reference to FIGS. 6 to 27, by following the operating procedure up to the creation of a label.

First, when the power of the tape printing apparatus 1 is turned on to start the apparatus, the image that was displayed on the display screen 81 immediately before the power was turned off the last time is shown on the display screen 81.

More specifically, the tape printing apparatus 1 is configured such that even if the power thereof is turned off, not only settings registered by the user but also data of the image that was displayed immediately before the power was turned off the last time is stored together with data for editing the data (including data of its mode style) in the RAM 240, and hence an image formed based on the data of the image as well as the edit data thereof is displayed on the display screen 81 immediately after the start of the tape printing apparatus 1. It should be noted that if all the input images of characters and the like had been deleted before the power was turned off the last time, or if the tape printing apparatus 1 is used for the first time, only a line head-indicating mark (with a line number displayed in reverse video in a square box in normal video) for guiding the user in entering characters is displayed on the display area 84 of the display screen 81.

Figure 7:
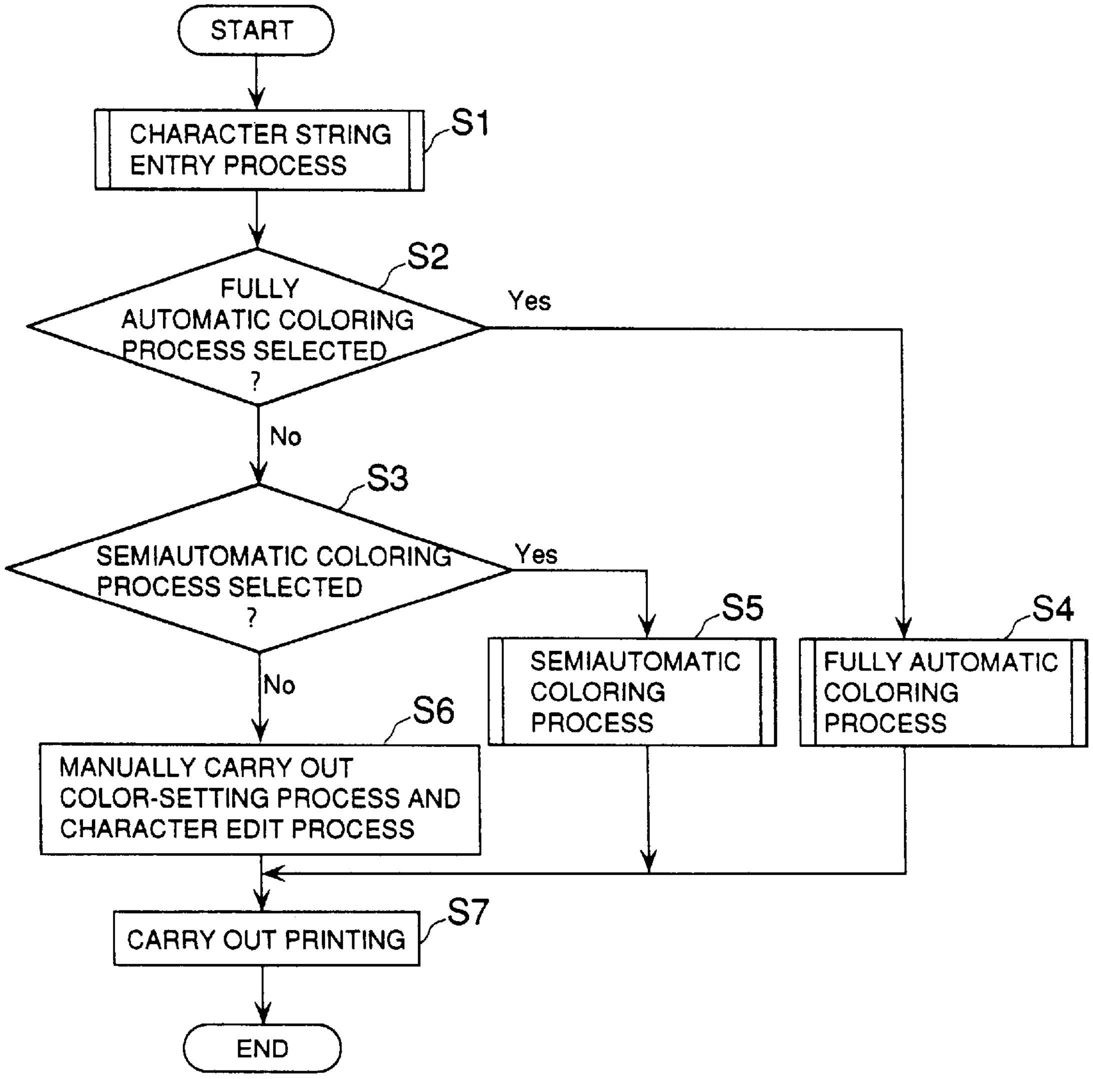
FIG. 7 is a flowchart showing an operating procedure from a character string entry process to a printing process.
Figure 8:
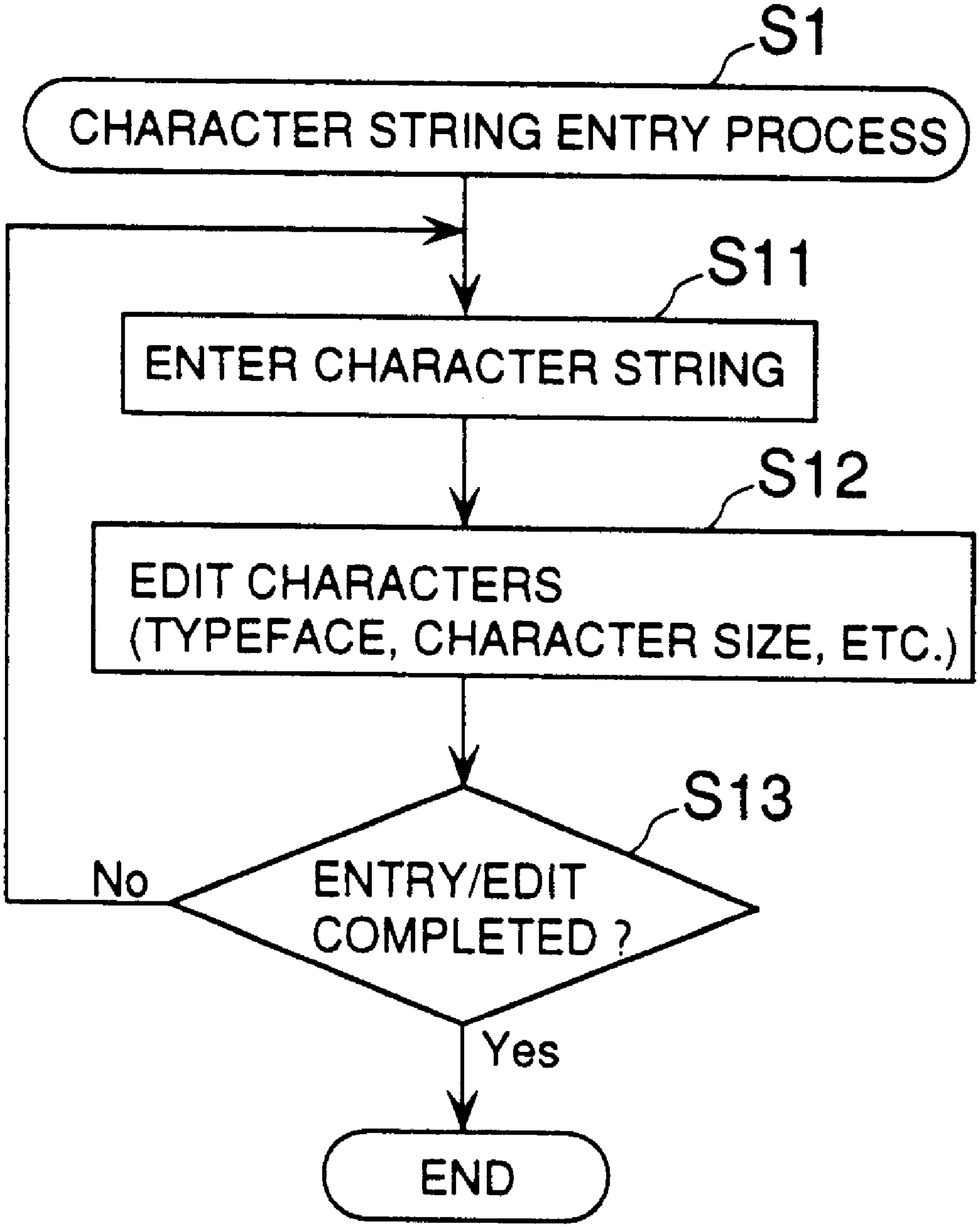
FIG. 8 is a flowchart showing the character string entry process.
Figure 9:
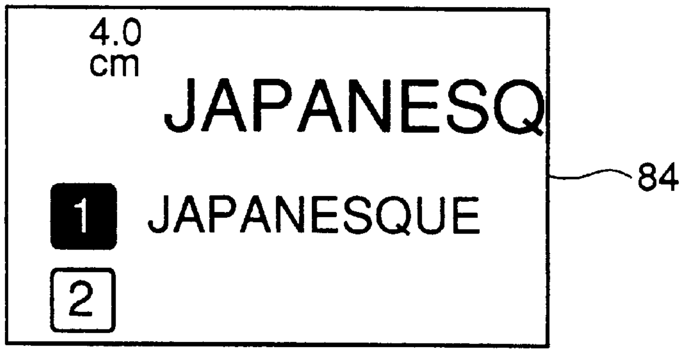
FIG. 9 is a diagram showing a screen displayed on the display area when a character string is entered.
Figure 10A:
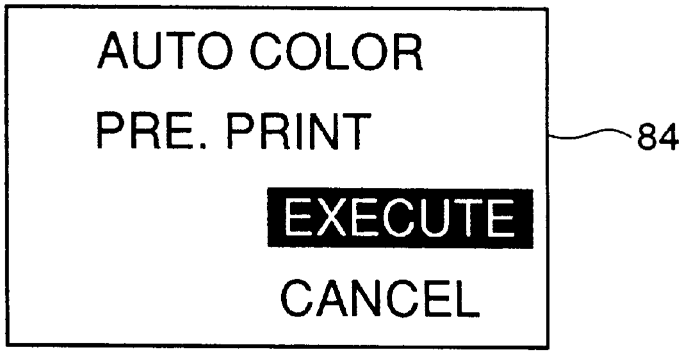
Figure 10B:
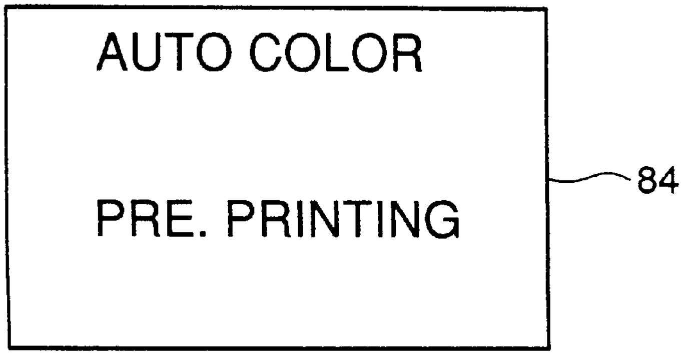

FIG. 7 is a flowchart showing an operating procedure from the entry of a character string to the printing of the same. As shown in the FIG., when a label is produced, first, the user himself enters a desired character string at step Si. In this character string entry process (S1), the keyboard 3 is operated to input the desired character string at step S11 in FIG. 8. Now, for instance, let it be assumed that a character string of "JAPANESQUE" is entered. Then, as shown in FIG. 9, the entered character string of "JAPANESQUE" is displayed on a right-hand side of the line head-indicating mark in the display area 84, while a print image of the entered character string ("JAPANESQUE") and a length of a resulting label (hereinafter referred to as "the tape length") are displayed at the upper half of the display area 84.

This print image is displayed on the display area 84 by loading the data of the character string of "JAPANESQUE" into the RAM 240 and supplying control signals for displaying the image to the liquid crystal display (LCD) -driving circuit 283. The tape length is calculated based on a character size of each character of the character string "JAPANESQUE", the a number of the characters and an inter-character distance (i.e. space interval between each pair of adjacent characters) of the characters of the string, and forward and backward margins are added to the results of the calculation to display the resulting value as the tape length. Further, according to the tape printing apparatus 1, to produce a label having a fixed length, the user himself can set the length of the label (fixed Length printing). In this case, the length set by the user is displayed.

After entering the character string, editing thereof including the setting of a typeface and a character size to the character string other than the setting of colors to the same (hereinafter referred to as "the character edit") is carried out according to need at step S12. When the entry and the character edit of the desired character string are all completed at step S13, the character string entry process (S1) is terminated. Further, the character edit other than the setting of a typeface and a character size will be described hereinafter in relation to a manual setting function.

Thereafter, color setting for effecting various settings for coloring the above character string which is already entered and subjected to character edit is carried out by a procedure described hereinafter (S2 to S6). The color setting includes setting of a background color, a background pattern (hereinafter a background having a pattern is referred to as "the decorative background"), a color of characters (character color), etc. to a character string. Further, the character color includes not only a color of characters per se but also a color of shades in the case of each character being printed with shades, and a color of outlines of characters when characters are printed as hollow characters.

After completion of the color setting, a printing operation is instructed at step S7 to create the label. The tape printing apparatus 1 has the following three functions as to the color setting:

(1) function of automatically presenting several combinations of backgrounds of a character string and character colors according to an entered character string (hereinafter this function is referred to as "the fully automatic coloring function"), (2) function of presenting several combinations of backgrounds of a character string and character colors according to an impression (more specifically, according to a title or word representative of the impression e.g. "Colorful", "Sober" or "Warning") of an image of a label which the user desires to create (hereinafter this function is referred to as "the semiautomatic coloring function"), and (3) function enabling the user himself to set a background of a label or a color of characters (hereinafter referred to as "the manual setting function").

In the following, character string-processing (editing, printing) carried out by the character processing device according to the embodiment of the invention will be described in detail. To this end, a process for the color setting of a character string by utilizing the above functions, particularly, a process for setting a background to the character string is described. Therefore, in this case, processing instruction elements define processes which can be selected to set a background to a character string.

Now, first of all, the setting of a background to a character string and the color setting of a color to characters thereof by the fully automatic coloring function are described. When this function is carried out, the automatic coloring key 322 on the keyboard 3 is depressed (Yes to S2), whereby the operational mode is changed to an automatic coloring mode to thereby switch the display area 84 shown in FIG. 9 to a screen shown in FIG. 10A. Now, when an option "EXECUTE" is selected, the display area 84 is switched to a screen shown in FIG. 10B and preview printing, described hereinafter, is started to preliminarily print several combinations of backgrounds of a label and a character color automatically selected according to a character string ("JAPANESQUE"). Then, the user selects a desired one from the several combinations preliminarily printed before execution of real printing, or sets details of the selected combination similarly to the manual setting function, and then carries out real printing. Thus, a desired label is produced.

Figure 11:
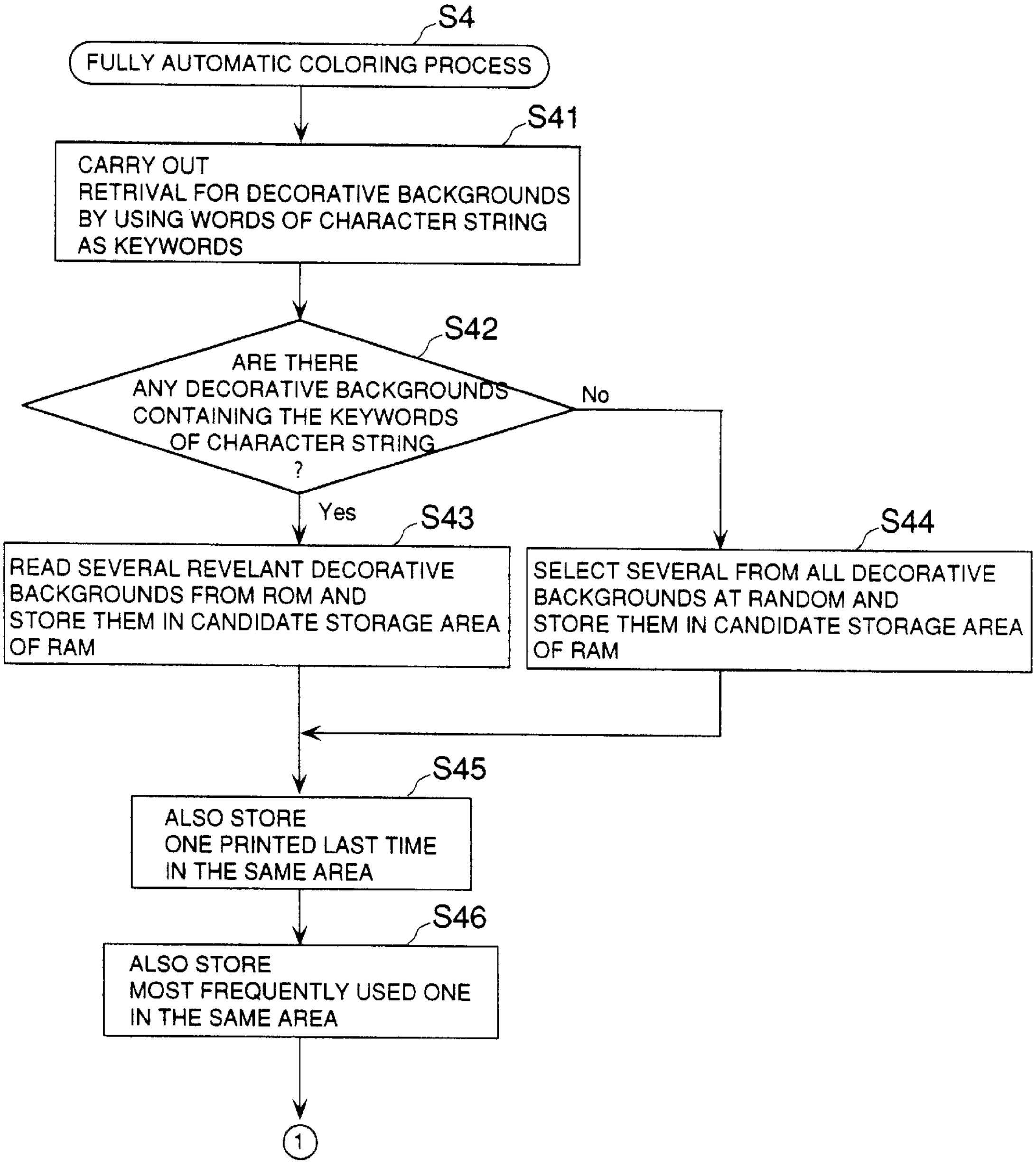
FIG. 11 is a flowchart showing a fully automatic coloring process.
Figure 12:
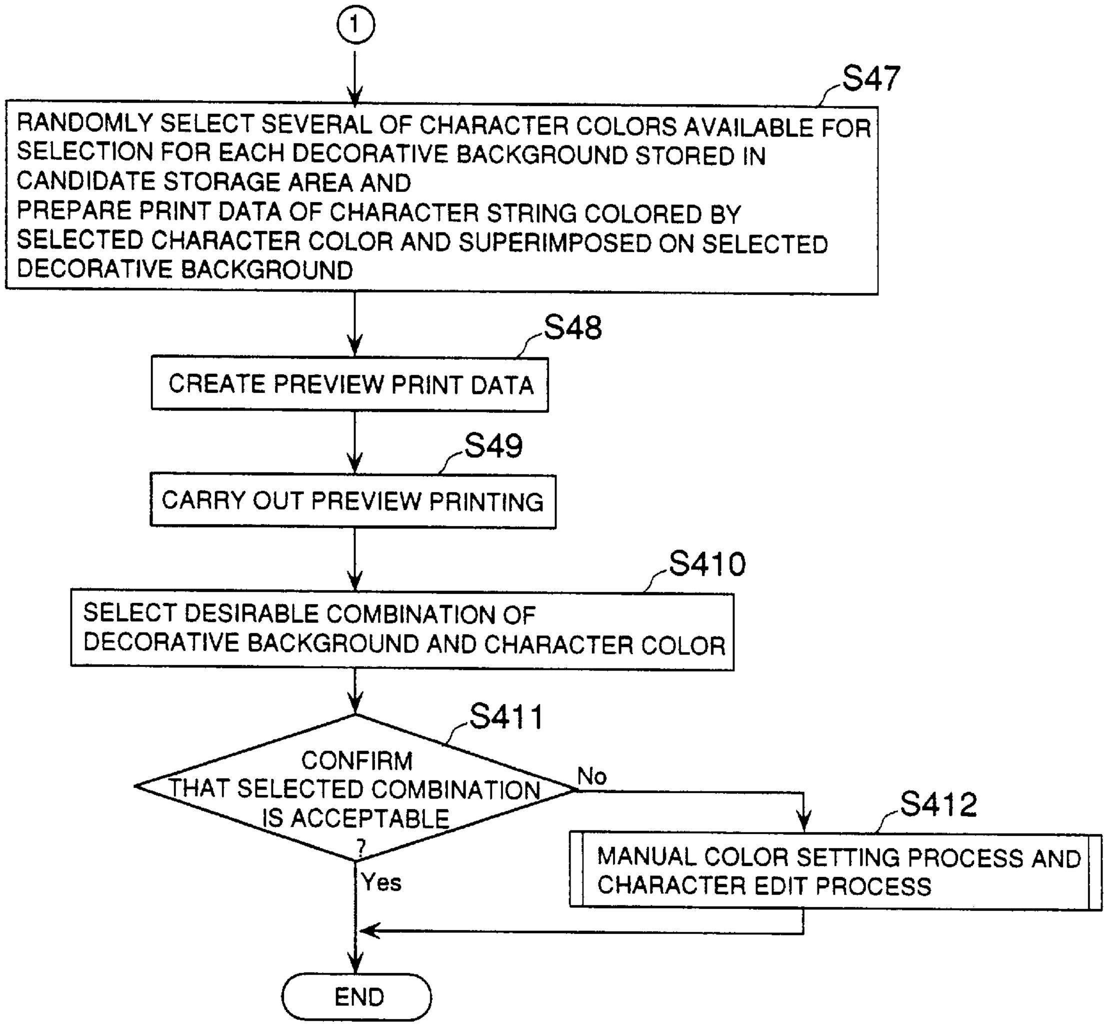
FIG. 12 is a continuation of the FIG. 11 flowchart.

Referring now to FIGS. 11 and 12, the process by the fully automatic coloring function (fully automatic coloring process) will be described in detail. When the automatic coloring key 322 is depressed to start the fully automatic coloring process, it is determined at step S41 whether or not a keyword provided in each type of background is included in the entered character string. As referred to hereinabove, the background includes the plain-colored background and the decorative background. In the present embodiment, there are provided about sixty-four types of plain-colored backgrounds and about forty types of decorative backgrounds, which are stored in the ROM 220 in advance. A plurality of keywords are defined for each background. Each keyword is formed of a character string comprised of one to several words having a relevance with an associated background in that it expresses or represents the background. The keywords are stored in the ROM 220. Some of the above keywords are registered in a duplicated manner for use with a plurality of decorative backgrounds. Further, the user can register keywords himself in addition to ones registered in advance. The keywords registered by the user are stored in the RAM 240.

The retrieval is executed by the CPU 210 according to a retrieving program stored in the ROM 220, by comparing the character string ("JAPANESQUE") entered and developed in the RAM 240 with keywords read out from the ROM 220 or the RAM 240, more specifically, by comparing each keyword formed by extracting at east portion of the character string with each of the keywords read from the ROM 220. Therefore, in the present embodiment retrieval means of the invention is comprised of the retrieving program, the CPU 210, the RAM 240 and the ROM 220. Similarly, keyword-extracting means of the invention is comprised of a keyword-extracting program, the CPU 210, the RAM 240 and the ROM 220.

In the following, for simplicity of description, a case where a decorative background is selected as the background will be described.

Figure 13A:
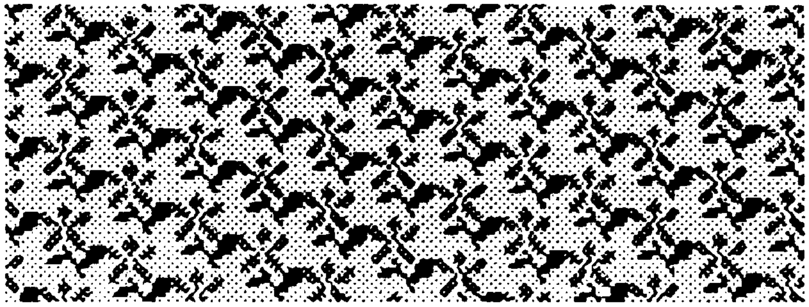
FIG. 13A is a diagram showing an example of a decorative background (Floral)
Figure 13B:
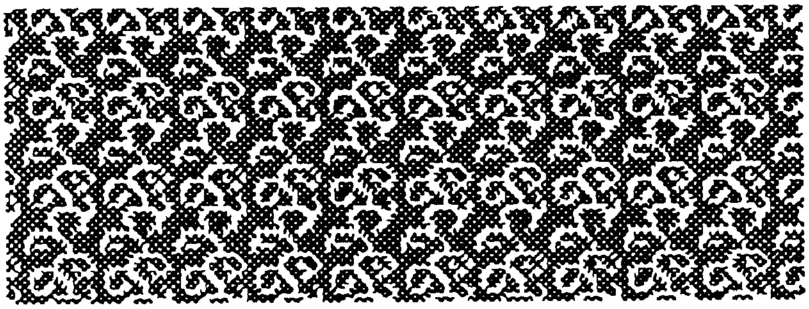
FIG. 13B is a diagram similar to FIG. 13A, showing another example of a decorative background (Arabesque)
Figure 13C:
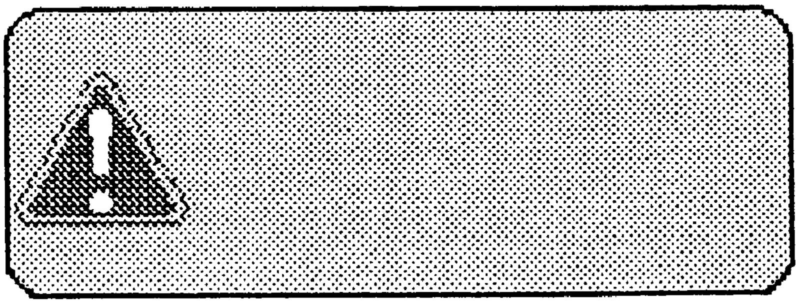
FIG. 13C is a diagram similar to FIG. 13A, showing still another example of a decorative background (Caution)

The following TABLE 1 shows titles (titles of backgrounds) of examples of decorative backgrounds (Decorative backgrounds 1 to 3), keywords provided for each decorative background, and character colors which can be selected for a character string superposed on each decorative background. FIGS. 13A to 13C shows print images of Decorative backgrounds 1 to 3 (titles of backgrounds: "Floral", "Arabesque" and "Caution").

TABLE 1

| | | |
|---|---|---|
| Decorative background 1 | Title of background | Floral |
| | Retrieval keywords | flower, park, woman, . . . |
| | Character colors available for selection | red, pink, green, . . . |
| Decorative background 2 | Title of background | Arabesque |
| | Retrieval keywords | Japan, kimono, . . . |
| | Character colors available for selection | white, gray, yellow, light blue, . . . |
| Decorative background 3 | Title of background | Caution |
| | Retrieval keywords | prohibition, strict prohibition, caution, . . . |
| | Character colors available for selection | red, orange, black, . . . |

As shown in TABLE 1, "flower", "park", "woman", etc. are registered as keywords for the decorative background having the title of "Floral". "Japan", "kimono", etc. are registered, for the decorative background having the title of "Arabesque", and "prohibition", "strict prohibition", "caution", etc. for "Caution". When color printing of each decorative background shown in FIGS. 13A to 13C is carried out, the FIG. 13A decorative background of "Floral" is printed with the ground color thereof in pink, the five petals of each flower in red and the leaves thereof in green, while the FIG. 13B decorative background of "Arabesque" is printed with the ground color thereof in green and the pattern thereof in white, and the FIG. 13C decorative background of "Caution" with its ground color in yellow, a triangle mark at a right-side end thereof in black and a mark "!" in the triangle mark in white. It should be noted that ". . ." set forth in rows of "Retrieval keywords" and "Characters colors available for selection" in TABLE 1 means that there are keywords and colors registered other than those shown in the rows.

After the retrieval at step S41, when there are decorative backgrounds for which any keyword of the character string (Yes to S42) is registered as a keyword assigned thereto, several (approximately one to five) of the relevant decorative backgrounds are read out from the ROM 220 and stored in an area (candidate storage area) in the RAM 240 at step S43. For instance, since the above entered character string "JAPANESQUE" contains "Japan", which is a registered keyword assigned to the decorative background of "Arabesque", as shown in TABLE 1, at least the data or information of the decorative background of "Arabesque" is stored in the candidate storage area. Thus, a predetermined decorative background is stored as a selection candidate in the candidate storage area according to the results of the above-mentioned retrieval, and therefore in the present embodiment, selection candidate-selecting means of the invention is comprised of a program module for storing predetermined decorative backgrounds in the candidate storage area, the CPU 210, the ROM 220 and the RAM 240.

On the other hand, when the entered character string does not include any of the keywords, several (approximately one to five) decorative backgrounds are selected at random from all the decorative backgrounds as selection candidates and, data or information of the selected decorative backgrounds is stored in the candidate storage area in the RAM 240 at step S44 in the same manner as described above.

Further, in the candidate storage area are also stored the data or information of the decorative background which was printed the last time (S45) and that of the decorative background which was printed (selected) the largest number of times up to the present label-forming operation (S46). More specifically, the data or information of the decorative background which was printed last time (including data or information of the character color of the character string) was stored in the RAM 240 or an EEPROM, not shown, (immediately preceding processing-storing means) when the immediately preceding printing operation was carried out, and the stored data is read into the candidate storage area in the RAM 240. On the other hand, to select the decorative background which was printed (selected) the largest number of times, data or information of a printed decorative background (including a character color of character string) is stored in the RAM 240 (most frequent processing-storing means) whenever printing is carried out, and at the same time the number of printing operations for printing the decorative background is stored in the RAM 240 in a manner correlated to the printed decorative background. Data or information of an decorative background which is correlated to the largest number of all numbers of printing operations is stored the candidate storage area.

Next, as shown in FIG. 12, several (approximately one to five) character colors are selected from the character colors available for selection for each of all the decorative backgrounds in the candidate storage area, and print data of the character string colored by using each selected character color and superposed on the corresponding decorative background is created in the RAM 240 at step S47. It should be noted that character colors available for selection are defined beforehand for each decorative background s(D as to avoid causing the character colors to become identical or similar to the color of the decorative background, which would otherwise result in difficulty in recognition of a character string on a label formed by color printing.

Then, data for preview printing is formed based on the created print data at step S48, and the tape T subjected to preview printing is delivered via the tape exit 10 out of the apparatus.

The preview printing is printing preliminary or preparatory to real printing (printing for actually producing a label). In the preview printing, decorative backgrounds available for selection having a character string written thereon (preview images) are printed in color with a smaller size than in the real printing. Further, in the preview printing, depending on the width of the tape T the preview images are printed differently in the direction of printing. That is, when the tape T has a large width, each preview image is printed in a direction orthogonal to the longitudinal direction of the tape T, as shown in FIG. 14A, whereas when the tape T has a small width, each preview image is printed along the length of the tape T, as shown in FIG. 14B,.

It should be noted that when preview images are printed along the length of the tape T, preview images each having a length of approximately two or three centimeters are printed for purposes of saving of the tape T. Further, when a preview image to be printed has a character string formed of a large number of characters, a margin forward of the character string is not provided but the preview image is printed immediately from a head of the character string.

Figure 14A:
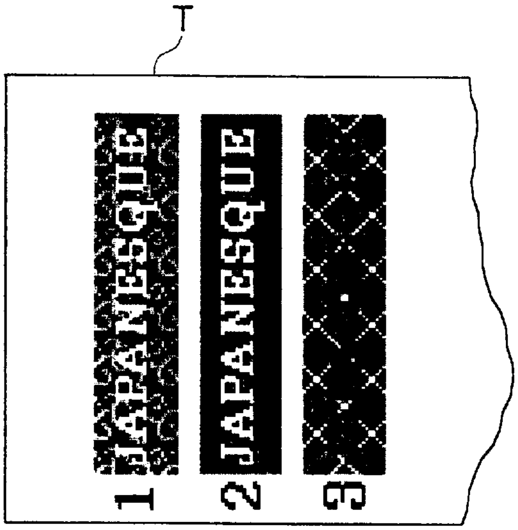
Figure 14B:
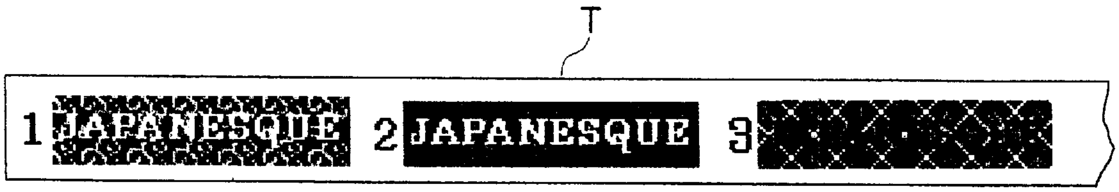
Figure 15:
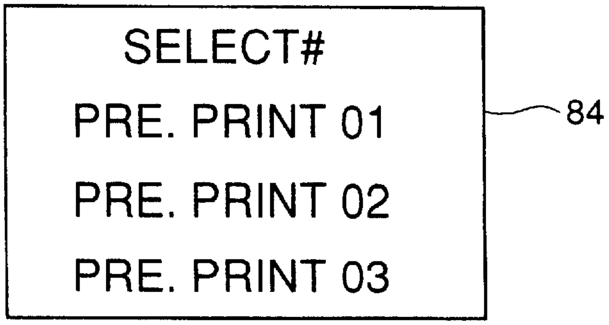
FIG. 15 is a diagram showing a selection screen for selecting a serial number of a preview image.
Figure 16:
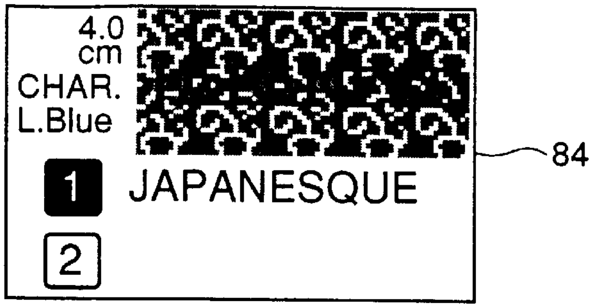
FIG. 16 is a diagram showing a screen displayed after selecting the serial number of the FIG. 15 preview image.
Figure 17A:
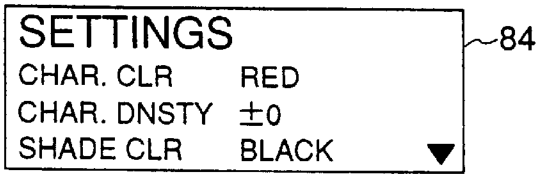
FIGS. 17A to 17G are diagrams showing print information items scrollably displayed on the whole display area.
Figure 17B:
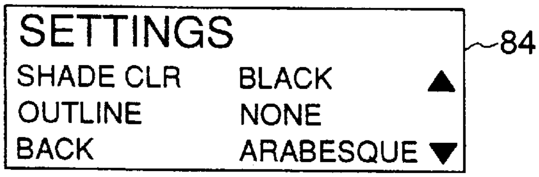
Figure 17C:
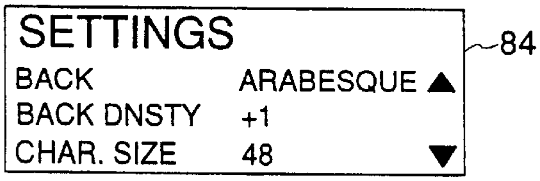
Figure 17D:
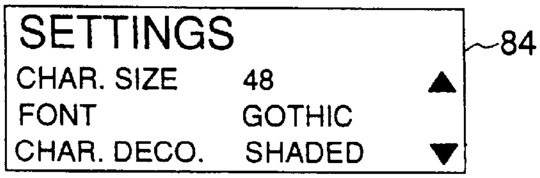
Figure 17E:
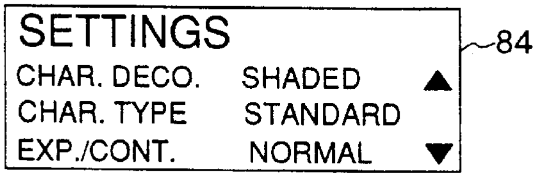
Figure 17F:
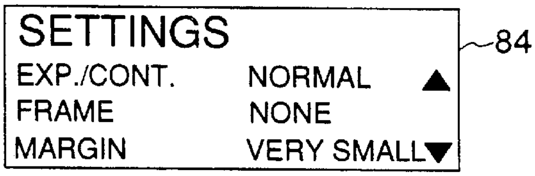
Figure 17G:
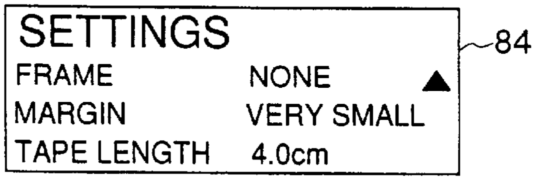
Figure 18:
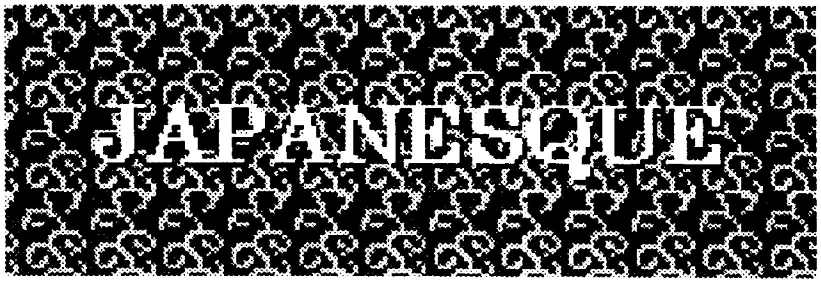
FIG. 18 is a plan view of a label printed (in color)

Further, as shown in FIGS. 14A and 14B, each preview image is numbered serially for selection of a desired preview image by using the number. That is, when the preview printing is terminated, the display area 84 is switched from the FIG. 10B screen to a selection screen for selecting a serial number of a preview image shown in FIG. 15, and the user moves the cursor to the number of a desired image to display the number in reverse video for selection at step S410. Thus, in the present embodiment, processing command-selecting means is comprised of components of the tape printing apparatus 1 for carrying out preview printing, the image display block 8 for displaying the preview image selection screen, and the keyboard 3 for selecting a desired preview image.

If serial number 1 (title of background: "Arabesque", character color: light blue) is selected, the operational mode is changed to an entry mode and the display area 84 is switched from the FIG. 15 preview image number selection screen to a screen shown in FIG. 16. As shown in the FIG., at an upper half of the display area 84 displaying a print image, a print image of the character string "JAPANESQUE" as well as a print image of the decorative background named "Arabesque" set to the background thereof in the above operation are displayed such that the former is superimposed on the other. Further, on a left-side end of the upper half of the display area 84, the tape length and the character color are displayed. In this process, one of the indicators 85 (second one from the left-hand end of the FIG. 4 upper indicators) indicating that the decorative background is set is lighted.

Although in the above embodiment, character colors available for selection, as shown in TABLE 1, are registered in advance for each decorative background, this is not limitative, but keywords may be defined similarly to decorative backgrounds to thereby enable selection of character colors according to the character string.

When the user considers that a label to be created according to the design (hereinafter referred to as "the label design") determined by the selected decorative background and the character color is acceptable (Yes to S411), he depresses the print key 321 of the keyboard 3, whereby the fully automatic coloring process is terminated and at the same time a print image with the label design selected by the above process is printed on the tape T at step S7 (in FIG. 7). In this process, data of the selected label design is stored or preserved in the RAM 240 or the EEPROM, not shown, and when the tape printing apparatus 1 is started on a subsequent occasion, the preserved data is read into the above candidate storage area as a selection candidate.

On the other hand, when the user desires to carry out the color-setting process or the character edit process on the label design determined in the above process, the decorative background or the character color is manually set at step S412, and thereafter the print key 321 is depressed for execution of the printing at step S8. The manual color-setting process etc. will be described when the manual setting function is described hereinafter.

Further, in the tape printing apparatus 1, contents (print information) set to a specific printing operation can be known in detail before the printing operation is actually started. This is because even if a print image is displayed on the display area 84 of the display screen 81 (see FIG. 16), it is impossible to grasp details of the actual print image, more particularly colors of a label design thereof, from the images displayed on the display 81 since the display unit 81 is formed of monochrome liquid crystal display. Therefore, the tape printing apparatus 1 is configured such that it is capable of collectively displaying print information on the display area 84 of the display screen 81. This function is referred to hereinafter as "the property display function".

When the property display function is to be carried out, the print information key 329 of the keyboard 3 is depressed. Then, the operational mode is changed from the entry mode to a print information-displaying mode, whereby the display area 84 is switched to another screen similar to one shown in FIG. 17A on which print information items are displayed.

According to the property display function, print information stored in the RAM 240 is read out by the CPU 210 and scrollably displayed on the display area 84 by the operation of the liquid crystal display (LCD)-driving circuit 283. Actually, print information items are displayed on the display area 84 by threes at a time, and a down arrow key or up arrow key of the cursor keys 327 is operated to scroll the displayed print information, as shown in FIGS. 17A to 17G. It should be noted that at a right-hand end of the display area 84 is displayed at least one of a delta mark and an inverted delta mark, which indicates that it is possible to scroll up and down the displayed print information by depressing the up arrow key and down arrow key of the cursor keys 327, respectively.

Although in the above embodiment, the displayed print information is scrolled, this is not limitative, but a displayed portion of print information may be switched to another by operating a predetermined function key 320. In such a case, one depression of the predetermined key displays print information by a predetermined number of displayed items (three in the present embodiment), so that the user can confirm the whole print information quickly before starting a printing operation.

When the print key 321 is depressed, the print image with the selected label design is printed on the printing tape T and the laminating tape T2 is affixed to the printed portion of the printing tape T. Then, the printed portion of the printing tape T is delivered from the tape exit 10 out of the apparatus and cut off by the cutting block 13 so as to complete a label shown in FIG. 18. It should be noted that characters of the label "JAPANESQUE" shown in the FIG. are printed with shades, and the color of the characters and that of the shades are printed in light blue and black, respectively. Further, the whole background is printed with an arabesque design having white patterns against a green background.

As described above, according to the fully automatic coloring function, several types of suitable label designs, each formed by a decorative background and a character color selected in combination from respective groups consisting of a lot of types thereof, are presented according to a character string entered, and hence the user can select a desired one from the several presented label designs in a simplified and quick manner and form a label with ease.

It should be noted that although according to the above fully automatic coloring function, the user can finally select a desired one from several types of label designs selected as described above, he (she) may determine a label design without carrying out the preview printing to create a label based on the design, when only one type of decorative background is selected according to the result of retrieval by using the keywords.

Further, even if a plurality of decorative backgrounds are selected according to the results of the retrieval, a label design may be determined under a predetermined condition without selecting the label design from the preview printing. Furthermore, the apparatus may be configured such that when two types of decorative backgrounds are selected, for instance, a label design is used in which one of the two types of decorative backgrounds is used for the right half of the label and the other for the left half of the label.

Next, the semiautomatic coloring function is described with reference to FIGS. 19 to 21. When the semiautomatic coloring function is described, it is also assumed that the character string of "JAPANESQUE" is input to the tape printing apparatus 1, similarly to the case of the above fully automatic coloring function.

Figure 19A:

To carry out the semiautomatic coloring function, the user depresses the automatic coloring key 322, while depressing the shift key 324 at the same time, whereby the operational mode is changed to a semiautomatic coloring mode to switch the display area 84 from the FIG. 9 screen to a screen shown in FIG. 19A. On this screen are displayed a plurality of titles (keywords) of respective impressions of images of backgrounds (background images), described hereinafter, under the title of "SEMIAUTOMATIC" (on the FIG. 19 screen there are displayed three titles of respective impressions of background images: "COLORFUL", "SOBER" and "WARNING"). By operating the up arrow key and down arrow key of the cursor keys 327, the titles of impressions as shown in FIG. 19A can be scrolled up or down to display other titles of impressions of background images.

Figure 19B:
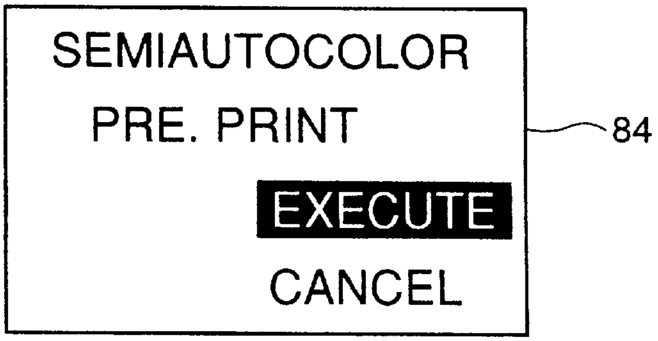
FIG. 19B is a diagram showing a selection area in which execution of the preview printing is selected.
Figure 19C:
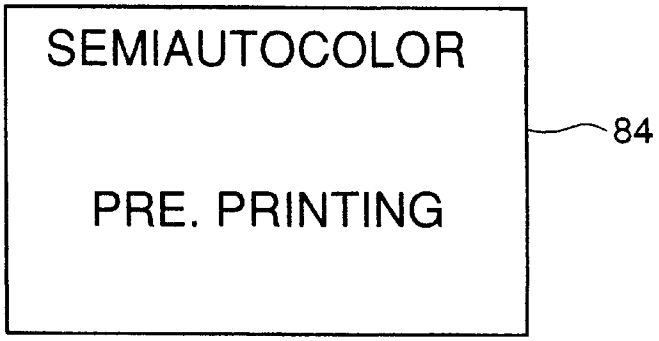

When a desired one is selected from the above three titles of impressions, a screen for starting the preview printing, shown in FIG. 19B, is displayed, similarly to the case of the automatic coloring function. Now, when an option "EXECUTE" is selected, the display area 84 is switched to a screen shown in FIG. 19C, similarly to the case of the automatic coloring function, and the preview printing is started to preliminarily print several combinations of backgrounds of a label and character colors which match with the character string ("JAPANESQUE"). Then, similarly to the case of the automatic coloring function, the user selects a desired one from the several combinations preliminarily printed to carry out real printing, and thereby produce a desired label.

Figure 20:
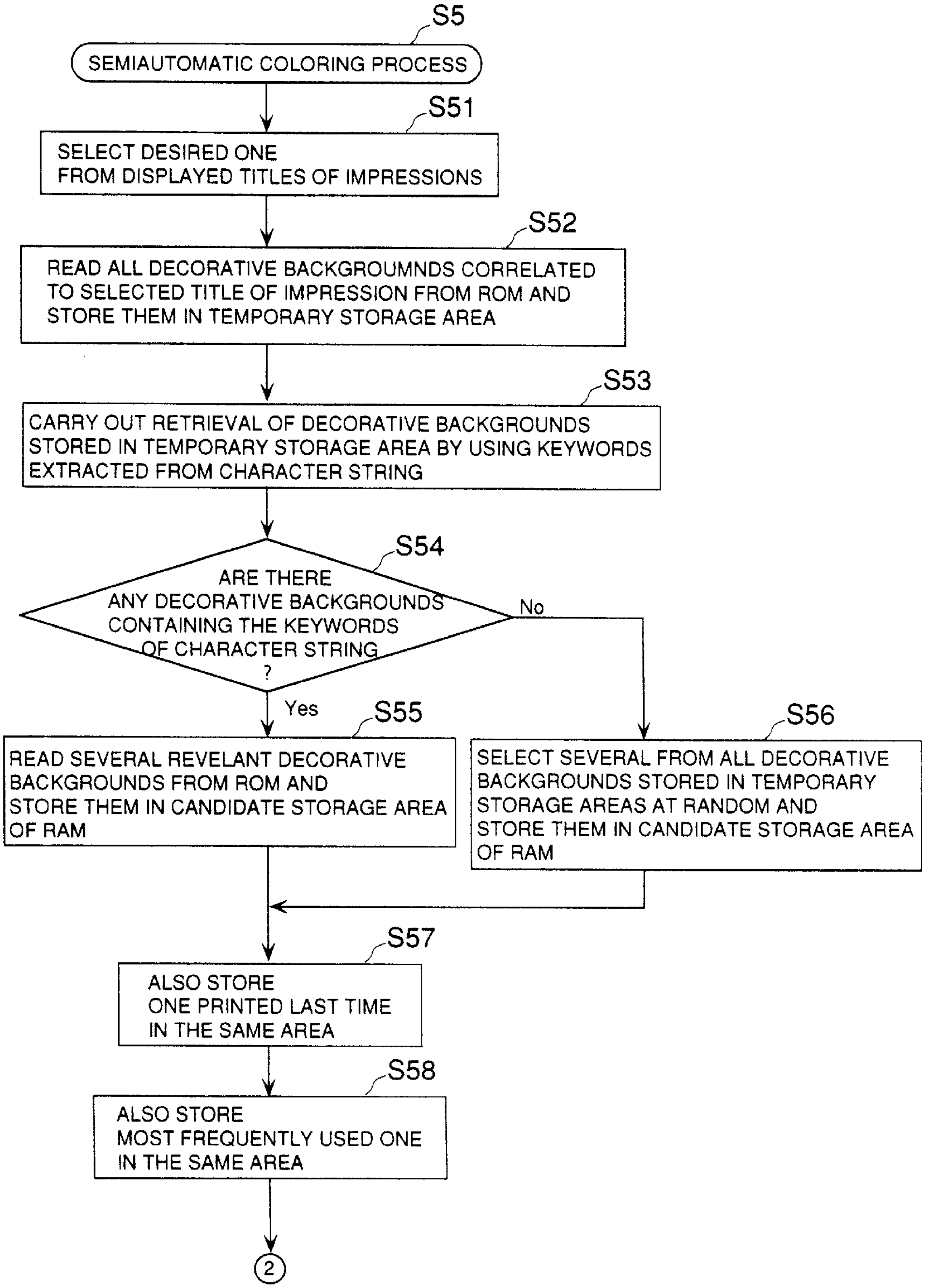
FIG. 20 is a flowchart showing the semiautomatic coloring process.
Figure 21:
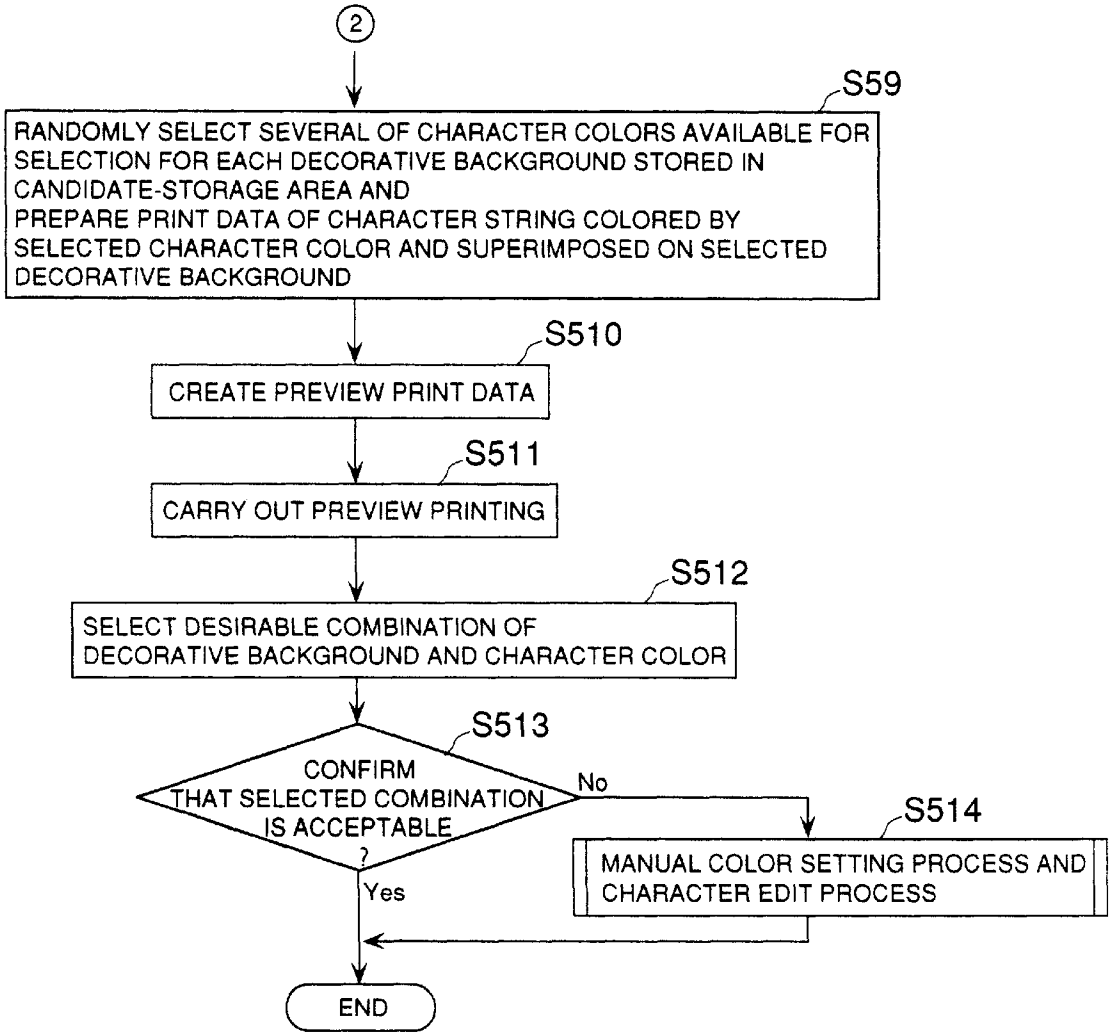
FIG. 21 is a continuation of the FIG. 20 flowchart.

Referring now to FIGS. 20 and 21, a process by the semiautomatic coloring function (semiautomatic coloring process) will be described in detail. It should be noted that processes carried out at steps S57 to 58 in FIG. 20 and steps S59 to S514 in FIG. 21 are identical to those carried out at steps S45 to S46 in FIG. 11 and steps S47 to S412 in FIG. 12 in the fully automatic coloring process and hence detailed description thereof is omitted.

As shown in FIG. 20, after starting the semiautomatic coloring process, the user selects a desired one from a plurality of titles of impressions of background images displayed on the display area 84 at step S51. These titles are relevant to decorative backgrounds. More specifically, the titles are verbal expressions of images or impressions of the decorative backgrounds, and for each decorative background a plurality of titles of impression are registered. In the following TABLE 2, there are shown titles of impressions for Decorative background 1 to Decorative background 3 (titles of backgrounds: "Floral", "Arabesque" and "Caution") corresponding to the above TABLE 1.

TABLE 2

| | | |
|---|---|---|
| Decorative background 1 | Title of background | Floral |
| | Impression of background image | light, feminine, colorful, . . . |
| Decorative background 2 | Title of background | Arabesque |
| | Impression of background image | Japanese, sober, . . . |
| Decorative background 3 | Title of background | Caution |
| | Impression of background image | Warning, colorful, . . . |

As shown in TABLE 2, Decorative background 1 (title of background: "Floral") contains words representative of impressions of Floral, such as "light", "feminine", "colorful", etc. Decorative background 2 (title of background: "Arabesque") contains "Japanese", "sober",. etc., and Decorative background 3 (title of background: "Caution") contains "Warning", "colorful", etc. Further, similarly to the aforementioned keywords, some of the titles of the impressions are registered in a duplicated manner for use with a plurality of decorative backgrounds. Furthermore, titles of impressions can be registered by the user as required in addition to ones registered in advance.

If the keyboard 3 (keyword-selecting means) is operated as required on the FIG. 19A selection screen for selecting a title of impression, and if the title of impression "Sober" is selected, for instance, data of all the decorative backgrounds correlated to the selected title of impression is read out from the ROM 220 and stored in an area of the RAM 240 (temporary storage area) for temporarily storing the data at step S52. When the title of impression of "Sober" is selected, for instance, not only the decorative background 2 (title of background: "Arabesque") but also all the decorative backgrounds containing "Sober" as one of their registered titles of impressions are stored in the temporary storage area.

Thereafter, it is determined at step S53 whether or not the above keywords provided for the respective decorative backgrounds stored in the temporary storage area are included in the entered character string "JAPANESQUE". When there are any decorative backgrounds whose keywords are included in the character string (Yes to S54), several (approximately one to five) of the corresponding relevant decorative backgrounds are read out from the ROM 220 and stored in the above candidate storage area of the RAM 240. In the illustrated example, since "Japan" is registered as one of the keywords for the decorative background of "Arabesque" stored in the temporary storage area, data or information of the decorative background of "Arabesque" is stored in the candidate storage area.

On the other hand, if none of the keywords for all the decorative backgrounds stored in the temporary storage area are included in the character string (No to S54), several (approximately one to five) decorative backgrounds are selected at random from all the decorative backgrounds stored in the temporary storage area and stored as candidates in the candidate storage area in the RAM 240 at step S56. Similarly to the case of the fully automatic coloring function, in the candidate storage area are also stored the decorative background which was printed (selected) last time (S57) and the decorative background which was printed (selected) the largest number of times up to the present label-forming operation (S58).

Then, similarly to the case of the fully automatic coloring function, a plurality of preview images formed by arranging the decorative backgrounds stored in the candidate storage area are subjected to the preview printing, and a desired one is selected from the printed preview image to thereby determine a label design. Thereafter, the print key 321 is depressed to create a label. Further, also in the case of the semiautomatic coloring function, the user can confirm print information before starting a printing operation.

As described above, according to the semiautomatic coloring function, the user selects a title of impression of a background image, whereby several types of decorative backgrounds complying with the user's intention are selected from a large number of decorative backgrounds, and suitable decorative backgrounds matching the character string are further selected from the selected several decorative backgrounds as the results of retrieval by using the keywords, so as to present the same as candidates for selection. The user can select a desired one from the candidate decorative backgrounds thus presented. Therefore, when the semiautomatic coloring function is employed for creating a label, the user can select a label design further complying with his (her) intention and matching a character string in a quick and simplified manner and thereby form a label with ease.

Although in the above semiautomatic coloring function, the user selects a title of an impression of a desired background, and searches decorative backgrounds selected according to the selected title of the impression, by using keywords, this is not limitative, but if a single decorative background is selected in response to the selection of the title of the impression, a label design to be formed by using the decorative background may be determined as a final label design, without carrying out the preview printing. Further, when there are a plurality of decorative backgrounds selected as the results of the selection of the title of the impression, a desired label design may be manually selected therefrom to determine a final label design.

Next, referring to FIGS. 22 to 27, the manual setting function will be described. The manual setting function is a function by which the user himself carries out the color-setting process for separately setting a decorative background and a character color to an entered character string and the character edit process for separately setting a typeface, a character size and the like to the same. The manual setting function is also a function for modifying the decorative background and the character color of a label design once selected in the fully automatic coloring function or the semiautomatic coloring function (S412, S514).

In the following, the setting of a decorative background and a character color by the color-setting process will be mainly described. Let it be assumed that also in the description the manual setting function, the character string of "JAPANESQUE" is input to the tape printing apparatus 1, similarly to the cases of the fully automatic coloring function and the semiautomatic coloring function.

Figure 22:
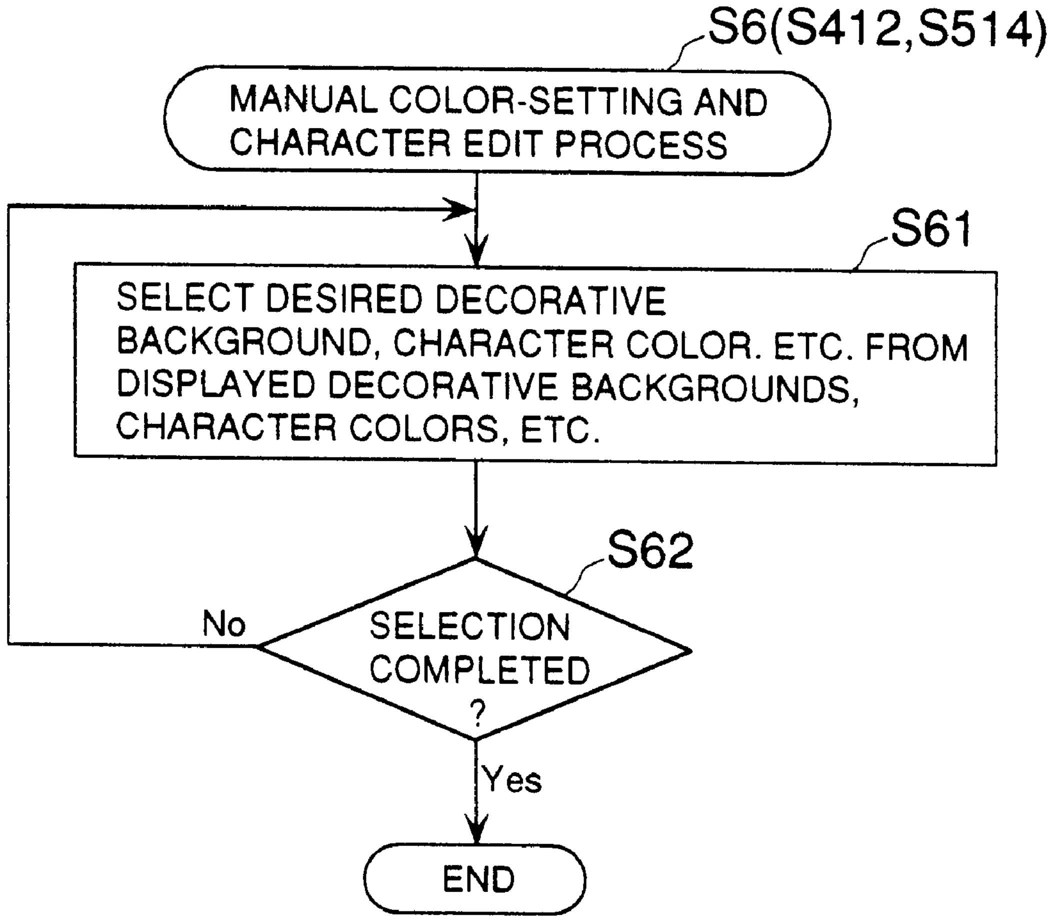
FIG. 22 is a flowchart showing a process for manually setting a decorative background and a character color.

Referring to FIG. 22, in processes carried out by using the manual setting function (the manual color-setting process, the manual character edit process), a desired decorative background and a desired character color are selected on a selection screen displaying menu options of decorative background sand character colors at step S61. The selection can be repeatedly carried out (by determination at step S62), and after completing all the desired settings, the selection is terminated. In the following, manners of setting a decorative background and a character color are described in detail.

Figure 23:
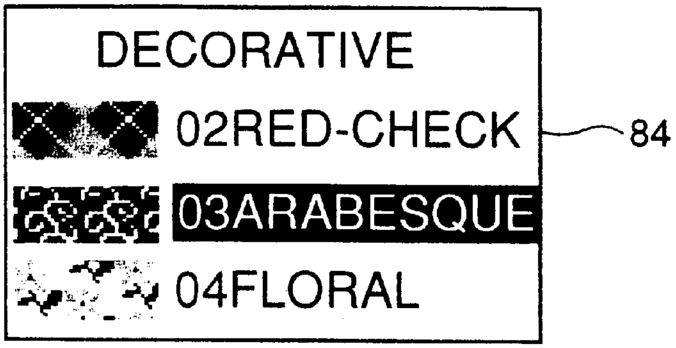
FIG. 23 is a diagram showing an edit screen for setting a decorative background.

To manually set a decorative background, first, the background edit key 330 is operated to switch the operational mode from the entry mode (see FIGS. 9 and 16) to the background edit mode, whereupon the display area 84 is changed to a screen for editing the background in which are shown decorative background of FIG. 23. In other words, the CPU 210 reads out data items of various decorative backgrounds (data of images and titles of backgrounds) from the ROM 220 in response to a background edit command from the keyboard 3 generated by the operation of the background edit key 330 and the data items read out are displayed on the display area 84 of the display screen 81 by operation of the liquid crystal display (LCD)-driving circuit 283.

As shown in FIG. 23, the title of an edit operation ("DECORATIVE" in the present embodiment) is displayed at an upper portion of the display area 84 and under the title are displayed a plurality of decorative backgrounds (three items on each screen in the embodiment) available for selection. More specifically, images of the decorative backgrounds are displayed at the left half of the display area 84, while at the right hale thereof are displayed titles of backgrounds as well as serial numbers assigned to the respective decorative backgrounds. The serial numbers are provided so as to enable the user to easily select a decorative background with reference to a list of decorative backgrounds printed in color, which is provided beforehand for users.

One of the titles of backgrounds is initially displayed in reverse video on the edit screen for editing a background ("ARABESQUE" in FIG. 23), to show that the background having the highlighted title was set when the background edit process was carried out last time. After operating the cursor keys 327 to place the cursor under the title of a desired decorative background, by depressing the selection key 328, the selected and desired decorative background is set to the background of the character string "JAPANESQUE". It should be noted that when the cursor is placed under "FLORAL", as the down arrow key of the cursor keys 327 is further depressed, the background edit screen is scrolled downward to bring another line of a decorative background and its title into view. Further, it is assumed here that "FLORAL" is selected in the present setting process of the decorative background.

Figure 24:
FIG. 24 is a diagram showing a screen displayed after setting the decorative background.

When the setting of the decorative background is completed, the operational mode is changed again from the background edit mode back to the entry mode to thereby switch the display area 84 to a screen shown in FIG. 24. That is, at the upper half of the display area 84, a print image of the character string "JAPANESQUE" superimposed on a print image of the decorative background "FLORAL" set in the above process as the background are displayed. At a left-hand end of the upper half of the display area 84, the tape length and the title of the background (in abbreviation if necessary) are displayed. It should be noted that if "Arabesque" was set as the decorative background in the preceding fully automatic coloring process or semiautomatic coloring process, it is changed to "Floral".

Figure 25:
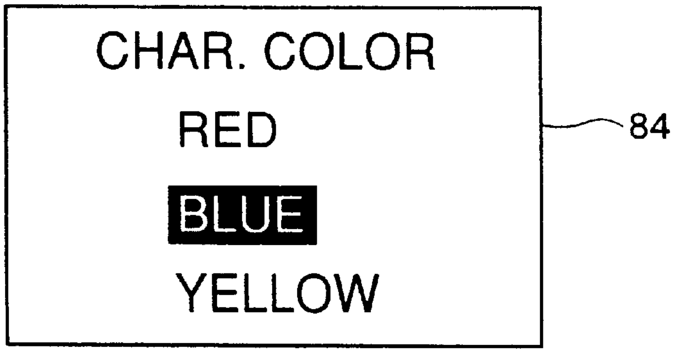
FIG. 25 is a diagram showing an edit screen for setting a character color.

Similarly, also in setting the character color, the character color edit key (one of the function keys 320) is operated as required and the operational mode is changed from the entry mode to the character color edit mode. Then, the display area 84 is switched to a characters color edit screen to display titles of character colors as shown in FIG. 25. The cursor keys 327 are operated to place the cursor under a desired character color and then the selection key 328 is depressed to thereby set the color of the character string "JAPANESQUE". In the illustrated example "BLUE" is selected.

Figure 26:
FIG. 26 is a diagram showing a screen displayed after setting the character color.

When the setting of the character color is completed, the operational mode is changed again from the character color edit mode back to the entry mode to switch the display area 84 to a screen shown in FIG. 26. That is, although the screen is approximately the same as the FIG. 24 screen, the character color set or changed in the above process is displayed under the tape length. It should be noted that, if "light blue" was set as the character color in the preceding fully automatic coloring process or semiautomatic coloring process, the character color is changed to "blue" in the new screen.

Although the color edit process is described based on the case where the background of a character string and the character color of the same are set, by way of an example, this is not limitative, but according to the tape printing apparatus 1, it is possible to carry out a lot of edit operations other than the background/character color-setting operations. TABLE 3 enumerates the above-described and other edit items, although description of detailed setting procedures thereof is omitted.

TABLE 3

| Edit item | Options |
|---|---|
| Character color | red, blue, yellow, . . . |
| Character color density | −2, −1, ±0, +1, +2 |
| Character outline color | red, blue, yellow, . . . |
| Background title (background color) | red-check, floral, arabesque, caution |
| Background color density | −2, −1, ±0, +1, +2 |
| Character size | 18, 24, 32, 48, 64, . . . (dots) |
| Font | Gothic, Mincho, . . . |
| Character modification | shade, half-tone dot meshing, underline, . . . |
| Character type | standard, italic, hollow, . . . |
| Character expansion/contraction | normal, expanded, contracted |
| Outer frame | round, square, . . . |
| Margins | very small, small, large, very large |
| Tape length | 1.0, ~, 4.0, ~, 50 (cm) |

As shown in TABLE 3, the edit items include not only the setting items concerning a character string itself ("Character color" to "Outer frame" in the column of "Edit item" in TABLE 3) but also the settings of the length of forward and backward margins and the length of a label to be produced (the tape length), which are printing conditions for printing images on the printing tape T. The settings of these printing conditions are configured by switching the display area 84 to the edit screen, similarly to the case of the above edit processes as to a character string itself.

Figure 27:
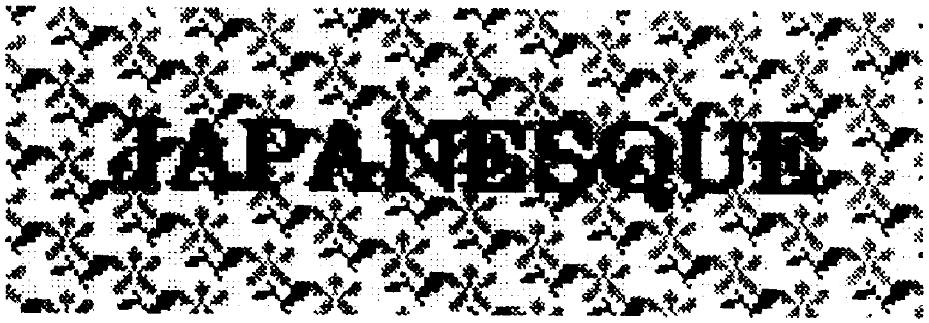
FIG. 27 is a plan view showing a label printed (in color).

By printing by using the decorative background and the character color set by the manual setting process, a label shown in FIG. 27 is created in the present case. The characters of "JAPANESQUE" of the label shown in the FIG. are printed in blue, while the ground color, five petals and leaves of the background thereof are printed in pink, red, and green, respectively.

As described above, according to the manual setting process, it is possible to set details of a character string, such as character colors. Further, if the manual setting function is utilized in combination with the fully automatic coloring function or the semiautomatic coloring function, it becomes possible to reset only selected details of a label design after the label design is completed to a certain degree, so that the user can create a desired label design quickly in a simplified manner.

Although in the above embodiment, the character processing device according to the invention is applied to the tape printing apparatus, and operations for editing and printing a character string using the apparatus are described, this is not limitative, but the present invention can be applied to various apparatuses so long as they are capable of processing a character string input thereto.

For instance, when the data transfer rate (processing instruction element) can be changed in several levels in facsimile transmission, a pager or an electronic mail (e-mail), it is possible to automatically select the data transfer rate according to a character string entered. More specifically, e.g. when the data transfer rate can be changed in three levels (high, medium and low transfer rates), keywords of "urgent" and "quick" are defined for the high and medium transfer rates, whereby when the keywords are contained in the character string, the data transfer rate can be automatically selected according to the character string to transmit the same over telephone lines.

It should be noted that although character strings are written on paper in the case of the facsimile, a character string read as an image thereof can be converted to data of character code before transmission by using an optical character reader (recognition device) (OCR) or OCR software, whereby it is possible to transmit the same by telephotography in the above-mentioned manner.

Further, the character processing device according to the invention can be applied to other apparatuses, such as a printing apparatus for printing a character in accordance with its typeface and size, an MD label-forming apparatus for forming a label with a background color matching the title of a song as a character string, and the like.

It should be noted that in a type of tape printing apparatus mainly used for printing Japanese language character strings, it is required to finally determine entered text with respect to character code conversion between Japanese Kana characters and Kanji characters and hence the keyboard 3 has a conversion key as one of the lower function keys 320 of the keyboard 3. When entered hirakana characters are to be converted to kanji characters, the conversion key and the cursor keys 327 are operated and when desired kanji characters are displayed, the selection key 328 is depressed to fix the entered characters.

Further, to indicate the current settings concerning a character entry mode in which a character entry method is set (Romaji entry mode, Kana entry mode)for entering Japanese characters via the keyboard 3, a typeface of character images (Mincho typeface and so forth) for a printing operation, a printing style (vertical writing, etc.), etc., corresponding ones of indicators 85 are lighted in this variation. For instance, when the Romaji entry mode is designated as the character entry mode, one of the indicators 85 immediately below a mode title "Romaji" in the mode title-indicating block 83 is lighted.

As described above, according to the invention, even when there are a lot of processing instruction elements available for selection, it is possible to suitably process a character string in accordance with the character sting itself in a quick and simplified manner.

It is further understood by those skilled in the art that the foregoing is a preferred embodiment of the invention, and that various changes and modifications may be made without departing from the spirit and scope thereof.

What is claimed is:

1. A character processing device including:

input means for inputting a character string formed of at least one character;

storage means for storing a plurality of processing instruction elements each specifying a process for processing said character string and at least one keyword associated with said process;

retrieval means for retrieving from said plurality of processing instruction elements, by using a predetermined keyword, a processing instruction element specifying said predetermined keyword as one of said at least one keyword; and processing means for processing said character string according to said processing instruction element when said processing instruction element has been retrieved by said retrieval means.

2. A character processing device according to claim 1, including keyword-extracting means for extracting at least one keyword as said predetermined keyword from said character string.

3. A character processing device according to claim 1, including keyword-presenting means for presenting a plurality of keywords for selection each associated with said process specified in each of any relevant ones of said plurality of processing instruction elements, and keyword-selecting means for selecting said predetermined keyword from said presented keywords.

4. A character processing device according to any of claims 1, 2, or 3, wherein said at least one keyword has a relevancy with said process.

5. A character processing device according to claim 1 or 2, further including:

candidate-setting means for setting, when there are a plurality of processing instruction elements retrieved by said retrieval means, said plurality of processing instruction elements retrieved by said retrieval means to candidates for selection; and processing instruction-selecting means for selecting said processing instruction element from said plurality of processing instruction elements set to said candidates for selection.

6. A character processing device according to claim 3, further including:

candidate-setting means for setting, when there are a plurality of processing instruction elements retrieved by said retrieval means, said plurality of processing instruction elements retrieved by said retrieval means to candidates for selection; and processing instruction-selecting means for selecting said processing instruction element from said plurality of processing instruction elements set to said candidates for selection.

7. A character processing device according to claim 6, wherein said processing instruction-selecting means comprises:

keyword-extracting means for extracting at least one keyword from said character string as said predetermined keyword, and second retrieval means for retrieving, from said plurality of processing instruction elements set to said candidates for selection, said processing instruction element, by using said at least one keyword extracted.

8. A character processing device according to claim 7, further including:

second candidate-setting means for setting, when there are a plurality of processing instruction elements retrieved by said second retrieval means, said plurality of processing instruction elements retrieved by said second retrieval means to second candidates for selection; and second processing instruction-selecting means for selecting said processing instruction element from said plurality of processing instruction elements set to said second candidates for selection.

9. A character processing device according to claim 5, further including immediately preceding processing-storing means for storing a processing instruction element selected in an immediately preceding character processing operation, and wherein said candidate-setting means also sets said processing instruction element stored in said immediately preceding processing-storing means to one of said candidates.

10. A character processing device according to claim 8, further including immediately preceding processing-storing means for storing a processing instruction element selected in an immediately preceding character processing operation, and wherein said second candidate-setting means also sets said processing instruction element stored in said immediately preceding processing-storing means to one of said second candidates.

11. A character processing device according to claim 5, further including most frequent processing-storing means for storing a processing instruction element selected from said plurality of processing instruction elements a largest number of times, and wherein said candidate-setting means also sets said processing instruction element stored in said most frequent processing-storing means to one of said candidates.

12. A character processing device according to claim 8, further including most frequent processing- storing means for storing a processing instruction element selected from said plurality of processing instruction elements a largest number of times, and wherein said second candidate-setting means also sets said processing instruction element stored in said most frequent processing-storing means to one of said second candidates.

13. A character processing device according to claim 1, wherein said input means includes read/conversion means which reads an image of a character string formed of at least one character written on paper, and at the same time converts said image to said input character string.

14. A character processing device according to claim 1, wherein said process specified by each of said plurality of processing instruction elements includes a process for editing said character string, a process for printing said character string, and a process for data transmission of said character string.

15. A character processing device according to claim 1, wherein said plurality of processing instruction elements are stored in said storage means in the form of a table specifying said process and said at least one keyword associated with said process for each of said plurality of processing instruction elements.

16. A character processing device according to claim 3, wherein said plurality of processing instruction elements are stored in said storage means in the form of a first table specifying said process and said at least one keyword associated with said process for each of said plurality of processing instruction elements and a second table specifying said process and a relevant one of said keywords for selection for said each of said plurality of processing instruction elements.

17. A character processing device according to claim 16, including a display device, and wherein said keyword-presenting means displays each of said keywords for selection on said display device for enabling selection thereof.

18. A character processing device according to claim 5, including a printing device, and wherein said candidate-setting means includes print-instructing means for instructing said printing device to print information of said processing instruction elements set to said candidates.

19. A character processing device according to claim 8, including a printing device, and wherein said second candidate-setting means includes print-instructing means for instructing said printing device to print information of said processing instruction elements set to said candidates.

* * * * *